US010321158B2

(12) United States Patent
Park et al.

(10) Patent No.: US 10,321,158 B2
(45) Date of Patent: Jun. 11, 2019

(54) MULTI-VIEW IMAGE ENCODING/DECODING METHODS AND DEVICES

(71) Applicant: SAMSUNG ELECTRONICS CO., LTD., Suwon-si (KR)

(72) Inventors: Min-woo Park, Yongin-si (KR); Jin-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 74 days.

(21) Appl. No.: 15/319,479

(22) PCT Filed: Jun. 17, 2015

(86) PCT No.: PCT/KR2015/006136
§ 371 (c)(1),
(2) Date: Dec. 16, 2016

(87) PCT Pub. No.: WO2015/194852
PCT Pub. Date: Dec. 23, 2015

(65) Prior Publication Data
US 2017/0134749 A1    May 11, 2017

Related U.S. Application Data

(60) Provisional application No. 62/013,831, filed on Jun. 18, 2014.

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/117* (2014.11); *H04N 19/119* (2014.11); *H04N 19/139* (2014.11); *H04N 19/176* (2014.11)

(58) Field of Classification Search
None
See application file for complete search history.

(56) References Cited

U.S. PATENT DOCUMENTS

2008/0240246 A1    10/2008    Lee et al.
2012/0200669 A1    8/2012    Lai et al.
(Continued)

FOREIGN PATENT DOCUMENTS

KR    10-2013-0005233 A    1/2013
KR    10-1366093 B1    2/2014
(Continued)

OTHER PUBLICATIONS

Chen et al., "Test Model 8 of 3D-HEVC and MV-HEVC", 8. JCT-3V Meeting; Mar. 29, 2014-Apr. 4, 2014; Valencia; (The Joint Collaborative Team on 3D Video Coding Extension Development of ISO/IEC JCT1/SC29/WG11 and ITU-T SG.16).*

(Continued)

*Primary Examiner* — William C Vaughn, Jr.
*Assistant Examiner* — Joseph Daniel A Towe
(74) *Attorney, Agent, or Firm* — Sughrue Mion, PLLC

(57) ABSTRACT

An inter-view video decoding method includes determining a reference value that is a reference for splitting a current block of a depth image corresponding to a texture image, from reference samples at a predetermined location of a reference block included in the texture image; determining a binary map of the current block by comparing the reference value and reference samples of the current block; splitting the current block into a plurality of partitions based on the binary map; and determining prediction values of the plurality of partitions based on adjacent samples of the current block and the binary map.

5 Claims, 34 Drawing Sheets

(51) Int. Cl.
*H04N 19/176* (2014.01)
*H04N 19/117* (2014.01)
*H04N 19/119* (2014.01)
*H04N 19/139* (2014.01)

(56) References Cited

U.S. PATENT DOCUMENTS

| | | | | |
|---|---|---|---|---|
| 2013/0271566 | A1* | 10/2013 | Chen | .................... H04N 19/597 348/43 |
| 2014/0133559 | A1 | 5/2014 | Kim et al. | |
| 2014/0247871 | A1 | 9/2014 | Merkle et al. | |
| 2015/0201214 | A1 | 7/2015 | Lin et al. | |

FOREIGN PATENT DOCUMENTS

| | | |
|---|---|---|
| WO | 2013/068566 A1 | 5/2013 |
| WO | 2014/000664 A1 | 1/2014 |

OTHER PUBLICATIONS

Jager et al., "Low Complex Partitioning Derivation for DBBP", 8. JCT-3V Meeting: Mar. 29, 2014-Apr. 4, 2014; Valencia; (The Joint Collaborative Team on 3D Video Coding Extension Development of ISO/IEC JCT1/SC29/WG11 and ITU-T SG.16).*

Written Opinion dated Oct. 13, 2015 issued by International Searching Authority in counterpart International Application No. PCT/KR2015/006136 (PCT/ISA/237).

International Search Report dated Oct. 13, 2015 issued by International Searching Authority in counterpart International Application No. PCT/KR2015/006136 (PCT/ISA/210).

Communication issued by the European Patent Office dated Dec. 19, 2017 in counterpart European Patent Application No. 15810128.7.

Ying Chen et al., "Test Model 8 of 3D-HEVC and MV-HEVC", 8th JCT-3V Meeting, Mar. 29-Apr. 4, 2014, Valencia, ES (The Joint Collaborative Team on 3D Video Coding Extension Development of ITU-T SG 16 WP 3 and ISO/IEC JTC 1/SC 29/WG 11), May 15, 2014, pp. 1-54, Document: JCT3V-H1003, URL: http://phenix.int-evry.fr/jct2/, XP030132293.

Fabian Jager et al., "Low Complex Partitioning Derivation for DBBP", 8th JCT-3V Meeting, Mar. 29-Apr. 4, 2014, Valencia, ES (Joint Collaborative Team on 3D Video Coding Extensions of ITU-T SG 16 WP 3 and ISO/IEC JTC 1/SC 29/WG 11), Mar. 21, 2014, pp. 1-6, Document: JCT3V-H0058, URL: http://phenix.int-evry.fr/jct2/, XP030132107.

\* cited by examiner

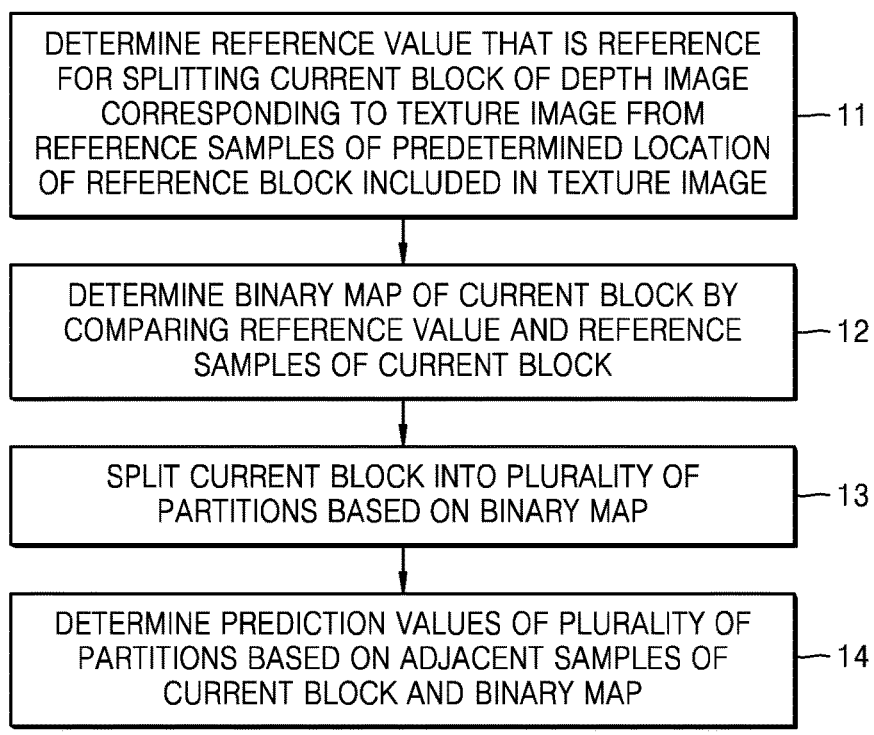

BINARY MAP

650

BINARY MAP

TRANSFORMATION UNIT (1300)

PREDICTION MODE (1310)

TRANSFORMATION UNIT SIZE (1320)

CODING UNIT (1510)

MULTI-VIEW IMAGE ENCODING/DECODING METHODS AND DEVICES

TECHNICAL FIELD

The present invention relates to a video encoding method and a video decoding method, which use multi-view image prediction, and, more particularly, to a method of determining a prediction block with respect to multi-view video encoding and decoding methods.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a coding unit having a predetermined size.

Image data of the space domain is transformed into coefficients of the frequency domain via frequency transformation. According to a video codec, an image is split into blocks having a predetermined size, discrete cosine transformation (DCT) is performed on each block, and frequency coefficients are encoded in block units, for rapid calculation of frequency transformation. Compared with image data of the space domain, coefficients of the frequency domain are easily compressed. In particular, since an image pixel value of the space domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multi-view video codec encodes and decodes a base-view picture and one or more dependent-view pictures. The base-view picture and the one or more dependent-view pictures respectively include a texture picture and a depth picture corresponding to a view. Redundancy of the base-view picture and the one or more dependent-view pictures and redundancy between the texture picture and the depth picture are removed, thereby reducing data of a multi-view video.

DETAILED DESCRIPTION OF THE INVENTION

Technical Problem

In the present specification, embodiments of a method of determining areas of partitions included in a coding block from a different reference block are provided.

Technical Solution

According to an aspect of the present invention, an inter-view video decoding method includes determining a reference value that is a reference for splitting a current block of a depth image corresponding to a texture image, from reference samples at a predetermined location of a reference block included in the texture image; determining a binary map of the current block by comparing the reference value and reference samples of the current block; splitting the current block into a plurality of partitions based on the binary map; and determining prediction values of the plurality of partitions based on adjacent samples of the current block and the binary map.

The determining of the reference value may include: determining an average value of reference samples located at apexes of the reference block as the reference value.

Samples of the binary map may be determined as 0 or 1, and the determining of the binary map may include: determining samples of the binary map corresponding to the reference samples according to whether the reference samples are greater than the reference value.

The plurality of partitions may include a first partition that includes samples located at a top left end of the current block and a second partition that does not include samples at the top left end of the current block, and wherein the determining of the prediction values may include: determining a horizontal edge flag by comparing samples located at a top left end of the binary map and samples located at a top right end of the binary map; determining a vertical edge flag by comparing the samples located at the top left end of the binary map and samples located at a bottom left end of the binary map; and determining a prediction value of the first partition and a prediction value of the second partition based on the horizontal edge flag, the vertical edge flag, and adjacent samples of the current block.

The inter-view video decoding method may further include: determining a prediction value of the current block based on the prediction values and offset information of the current block.

According to another aspect of the present invention, an inter-view video decoding method includes determining a prediction value reference block corresponding to a partition included in a current block of a texture image; determining a partition reference block corresponding to the current block from a depth image of a different view from a view of the texture image; determining a reference value that is a reference for splitting the current block, from reference samples at a predetermined location of the partition reference block; determining a binary map of the current block by comparing the reference value and reference samples of the partition reference block; determining an area of the partition based on the binary map; and determining prediction values with respect to samples included in the area of the partition based on samples corresponding to the area of the partition among samples of prediction value reference blocks.

The determining of the reference value may include: determining an average value of reference samples located at apexes of the partition reference block as the reference value.

Samples of the binary map may be determined as 0 or 1, and the determining of the binary map may include: determining samples of the binary map corresponding to the reference samples according to whether the reference samples are greater than the reference value.

The determining of the partition reference block may include: determining the partition reference block based on a reference view index indicating a disparity vector corresponding to the current block and a reference view image referred to by the current block.

The determining of the prediction value reference block may include: determining the prediction value reference block based on a reference index indicating a motion vector corresponding to the partition and a reference image referred to by the partition or a reference view index indicating a disparity vector corresponding to the partition and a reference view image referred to by the partition.

According to another aspect of the present invention, an inter-view video decoding apparatus includes a binary map determiner configured to determine a reference value that is a reference for splitting a current block of a depth image corresponding to a texture image, from reference samples at a predetermined location of a reference block included in the texture image and determine a binary map of the current block by comparing the reference value and reference samples of the current block; and a prediction value determiner configured to split the current block into a plurality of partitions based on the binary map and determine prediction values of the plurality of partitions based on adjacent samples of the current block and the binary map.

According to another aspect of the present invention, an inter-view video decoding apparatus includes a prediction value reference block determiner configured to determine a prediction value reference block corresponding to a partition included in a current block of a texture image; a partition reference block determiner configured to determine a partition reference block corresponding to the current block from a depth image of a different view from a view of the texture image; a binary map determiner configured to determine a reference value that is a reference for splitting the current block, from reference samples at a predetermined location of the partition reference block and determine a binary map of the current block by comparing the reference value and reference samples of the partition reference block; and a prediction value determiner configured to determine an area of the partition based on the binary map and determine prediction values with respect to samples included in the area of the partition based on samples corresponding to the area of the partition among samples of prediction value reference blocks.

According to another aspect of the present invention, an inter-view video encoding method includes determining a reference value that is a reference for splitting a current block of a depth image corresponding to a texture image, from reference samples at a predetermined location of a reference block included in the texture image; determining a binary map of the current block by comparing the reference value and reference samples of the current block; splitting the current block into a plurality of partitions based on the binary map; and determining prediction values of the plurality of partitions based on adjacent samples of the current block and the binary map.

According to another aspect of the present invention, an inter-view video encoding method includes: determining a prediction value reference block corresponding to a partition included in a current block of a texture image; determining a partition reference block corresponding to the current block from a depth image of a different view from a view of the texture image; determining a reference value that is a reference for splitting the current block from reference samples of a predetermined location of the partition reference block; determining a binary map of the current block by comparing the reference value and reference samples of the partition reference block; determining an area of the partition based on the binary map; and determining prediction values with respect to samples included in the area of the partition based on samples corresponding to the area of the partition among samples of prediction value reference blocks.

According to another aspect of the present invention, an inter-view video encoding apparatus includes: a binary map determiner configured to determine a reference value that is a reference for splitting a current block of a depth image corresponding to a texture image, from reference samples at a predetermined location of a reference block included in the texture image and determine a binary map of the current block by comparing the reference value and reference samples of the current block; and a prediction value determiner configured to split the current block into a plurality of partitions based on the binary map and determine prediction values of the plurality of partitions based on adjacent samples of the current block and the binary map.

According to another aspect of the present invention, an inter-view video encoding apparatus includes: a prediction value reference block determiner configured to determine a prediction value reference block corresponding to a partition included in a current block of a texture image; a partition reference block determiner configured to determine a partition reference block corresponding to the current block from a depth image of a different view from a view of the texture image; a binary map determiner configured to determine a reference value that is a reference for splitting the current block, from reference samples at a predetermined location of the partition reference block and determine a binary map of the current block by comparing the reference value and reference samples of the partition reference block; and a prediction value determiner configured to determine an area of the partition based on the binary map and determine prediction values with respect to samples included in the area of the partition based on samples corresponding to the area of the partition among samples of prediction value reference blocks.

According to another aspect of the present invention, a computer-readable recording medium has recorded thereon a computer program for executing the above-described inter-view video decoding method and encoding method.

Advantageous Effects

In the present specification, embodiments of a method of determining areas of partitions, when the areas of partitions included in a coding block are determined from a different reference block, are provided. A multi-view video encoding and decoding speed may be increased by optimizing a computing process necessary for determining the areas of the partitions.

DESCRIPTION OF THE DRAWINGS

FIG. 1B is a flowchart of a video decoding method according to an embodiment.

BEST MODE

According to an aspect of the present invention,
According to another aspect of the present invention,

MODE OF THE INVENTION

In various embodiments described in the present specification below, the term 'image' may comprehensively refer to a still image or a moving image such as a video.

The term 'sample' refers to data assigned to an image sampling location and data to be processed. For example, pixels of an image of a spatial domain may be samples.

In the present specification, a technique, a multi-view plus depth (MVD) map, of implementing a 3-dimensional (3D) image by processing depth information about a plurality of views is described. Terms for describing processing of multi-view depth information are described below.

The term 'base-view image' refers to a view image independently encoded/decoded with respect to a different view image.

The term 'dependent-view image' refers to a view image dependently encoded/decoded with respect to a different view image. Thus, the dependent-view image may be encoded dependently to an independent-view image or a different dependent view image.

The terms 'inter-view prediction' and 'disparity-compensated prediction (DCP)' refer to prediction techniques of predicting a current view image from a different view image.

The term 'disparity vector' refers to a motion vector used in an inter-view prediction.

The term 'texture picture' or 'texture map' refers to an image including color information of an object with respect to a current view.

The term 'depth picture' or 'depth map' refers to an image including information about a distance from a current view to a surface of an object.

Encoding/decoding methods of a multi-view image used to implement a 3D image are described below by using the above-described concept.

To implement the 3D image, texture images and depth images with respect to a plurality of views are necessary. For example, when the 3D image is implemented based on 3 views, three texture images and three depth images are necessary. Thus, a great amount of data is required when storing, transmitting, and reproducing the 3D image, compared to a 2D image.

Figure 5A:
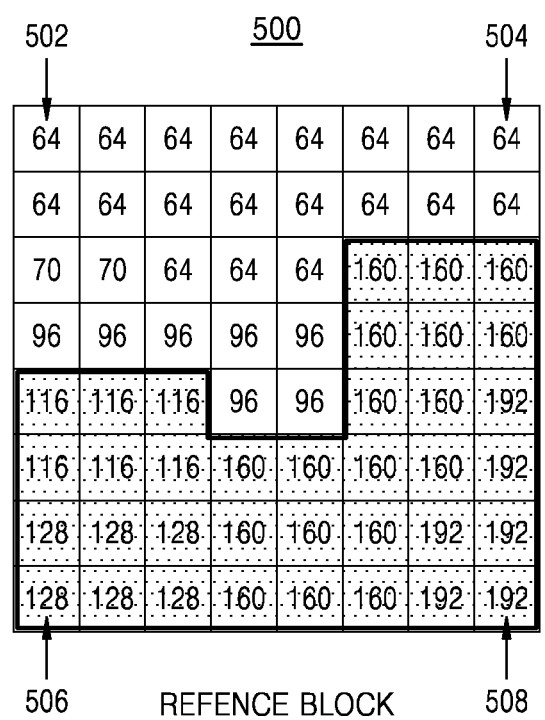
FIG. 5A illustrates a reference block for describing a video decoding apparatus according to an embodiment.

A coordinate (x,y) is determined with respect to a sample located at an apex of a top left side of a block. Specifically, a coordinate of the located at the apex of the top left side of the block is determined as (0,0). An x value of the coordinate increases in a right direction. A y value of the coordinate increases in a lower direction. For example, a coordinate of a sample 508 located at an apex of a lower right side of a reference block 500 of FIG. 5A is (7,7).

Figure 1A:
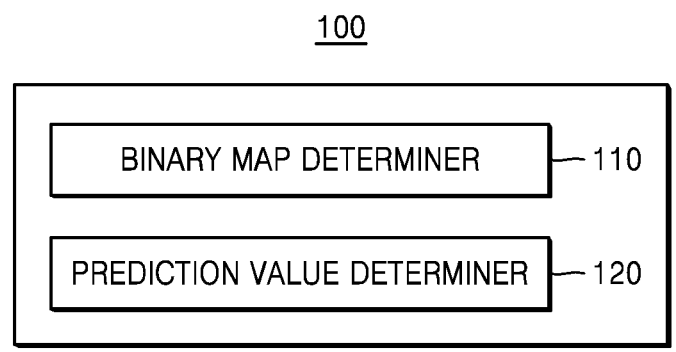
FIG. 1A is a block diagram of a video decoding apparatus according to an embodiment.

FIG. 1A is a block diagram of a video decoding apparatus 100 according to an embodiment. Specifically, FIG. 1A is a block diagram of an apparatus for performing an embodiment of an intra-contour mode.

The video decoding apparatus 100 may include a binary map determiner 110 and a prediction value determiner 120. Although the binary map determiner 110 and the prediction value determiner 120 are illustrated as separate configuration units in FIG. 1A, the binary map determiner 110 and the prediction value determiner 120 may be combined and implemented as the same configuration unit according to an embodiment.

Although the binary map determiner 110 and the prediction value determiner 120 are illustrated as configuration units located in one apparatus in FIG. 1A, apparatuses for performing functions of the binary map determiner 110 and the prediction value determiner 120 may not be necessarily adjacent to each other physically. Thus, the binary map determiner 110 and the prediction value determiner 120 may be scattered according to an embodiment.

The binary map determiner 110 and the prediction value determiner 120 of FIG. 1A may be implemented as one processor according to an embodiment. Also, the binary map determiner 110 and the prediction value determiner 120 may be implemented as a plurality of processors according to an embodiment.

The video decoding apparatus 100 may include a storage (not shown) for storing data generated by the binary map determiner 110 and the prediction value determiner 120. Also, the binary map determiner 110 and the prediction value determiner 120 may extract and use the stored data from the storage (not shown).

The video decoding apparatus 100 of FIG. 1A is not limited to a physical apparatus. For example, some of functions of the video decoding apparatus 100 may be implemented as software rather than hardware.

A current block, a reference block, and a binary map described with reference to FIGS. 1A and 1B are rectangular blocks having an N×N size. N is an integer and may be determined as being 8, 16, 32, or 64 according to an embodiment.

The binary map determiner 110 may determine a reference value with respect to a current block of a depth image and determine a binary map with respect to the current block according to a reference value.

The binary map determiner 110 may use a texture image corresponding to the depth image. The texture image and the depth image may include information about the same object at the same view and the same picture order counter (POC). Thus, the texture image and the depth image are related to each other. Therefore, the binary map determiner 110 may use the texture image of the same view and the same POC when decoding the depth image. Specifically, the binary map determiner 110 may use a reference block of the texture image corresponding to a location of the current block of the depth image.

The binary map determiner 110 may determine the reference value from reference samples included in the reference block. According to an embodiment, the binary map determiner 110 may determine a luma sample included in the reference block as a reference sample. According to an embodiment, the binary map determiner 110 may determine an average value of all reference samples of the reference block as the reference value. According to another embodiment, the binary map determiner 110 may determine an average value of reference samples of a predetermined location of the reference block as the reference value. As an example of the predetermined location, an average value of 4 reference samples located at apexes of the reference block may be determined as the reference value. Thus, an average value of a reference sample located at (0,0), a reference sample located at (N−1,0), a reference sample located at (0,N−1), and a reference sample located at (N−1,N−1) may be determined as the reference value. Methods of determining the reference value are merely some of various embodiments. The reference value may be determined by using different methods. An embodiment of a method of determining the reference values is described below by using a texture image of FIG. 5A.

FIG. 5A illustrates a reference block 500 having an 8×8 size. The reference block 500 may include the total number of 8×8 reference samples. According to an embodiment, the binary map determiner 110 may determine an average value of the 8×8 reference samples as the reference value. However, since it takes a long time to perform a computing process of calculating the average value of the 8×8 reference samples, the binary map determiner 110 may determine an average value of a reference sample 502 located at (0,0), a reference sample 504 located at (7,0), a reference sample 506 located at (0,7), and a reference sample 508 located at (7,7) as the reference value. For example, when values of the reference sample 502 located at (0,0), the reference sample 504 located at (7,0), the reference sample 506 located at (0,7), and the reference sample 508 located at (7,7) are respectively 64, 64, 128, and 192, 112 may be determined as the reference value.

The binary map determiner 110 may compare the reference value and samples of the reference block and determine the binary map of the current block. The binary map includes binary samples corresponding to a sample included in the current block. The binary sample has a value of 0 or 1. A sample value of the binary sample may be determined according to a result of comparing the reference sample and the reference value. According to an embodiment, when the reference value is greater than a sample value of the reference sample, the value of the binary sample corresponding to the reference sample may be determined as 1. To the contrary, when the reference value is smaller than the sample value of the reference sample, the value of the binary sample corresponding to the reference sample may be determined as 1. A method of determining the binary map is merely an embodiment. The binary map may be determined by using a different method. An embodiment of the binary map is described below with reference to FIGS. 5A and 5B.

Figure 5B:
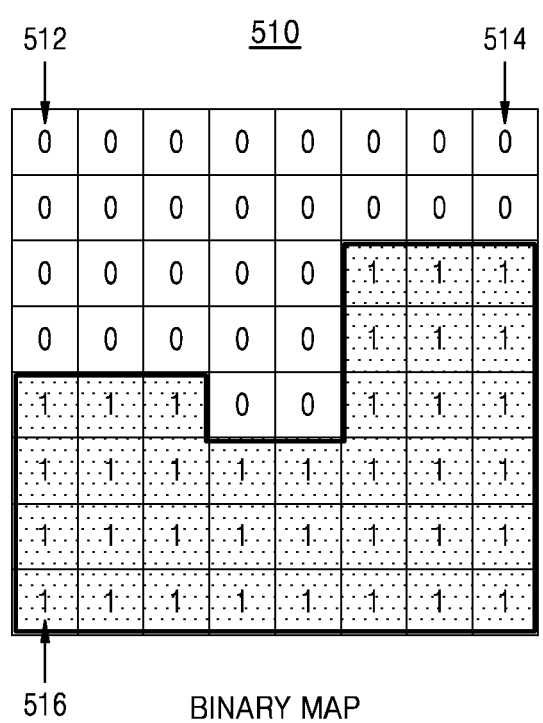
FIG. 5B illustrates a binary map for describing a video decoding apparatus according to an embodiment.

FIG. 5B illustrates an embodiment of a binary map 510 of an 8×8 size. The binary map 510 may correspond to the reference block 500 of FIG. 5A. Thus, a binary sample included in the binary map 510 may correspond to a reference sample of the reference block 500 according to a location. For example, a binary sample 512 located at (0,0) may correspond to the reference sample 502 located at (0,0).

A value of the binary sample may be determined according to a result of comparing the reference sample corresponding to the binary sample and the reference value. For example, when the reference value is 112 and a sample value of the reference sample is equal to or smaller than 112, a sample value of the binary sample corresponding to the reference sample may be determined as 0. To the contrary, when the sample value of the reference sample is greater than 112, the sample value of the binary sample corresponding to the reference sample may be determined as 1.

The prediction value determiner 120 may split the current block into a plurality of partitions based on the binary map determined by the binary map determiner 110. According to an embodiment, the prediction value determiner 120 may determine an area of a first partition corresponding to binary samples having the same sample value as the binary sample located at (0,0) of the binary map. The prediction value determiner 120 may also determine an area of a second partition corresponding to binary samples having different sample values from the binary sample located at (0,0) of the binary map. Thus, the first partition always includes a sample located at (0,0) of the current block.

Figure 5C:
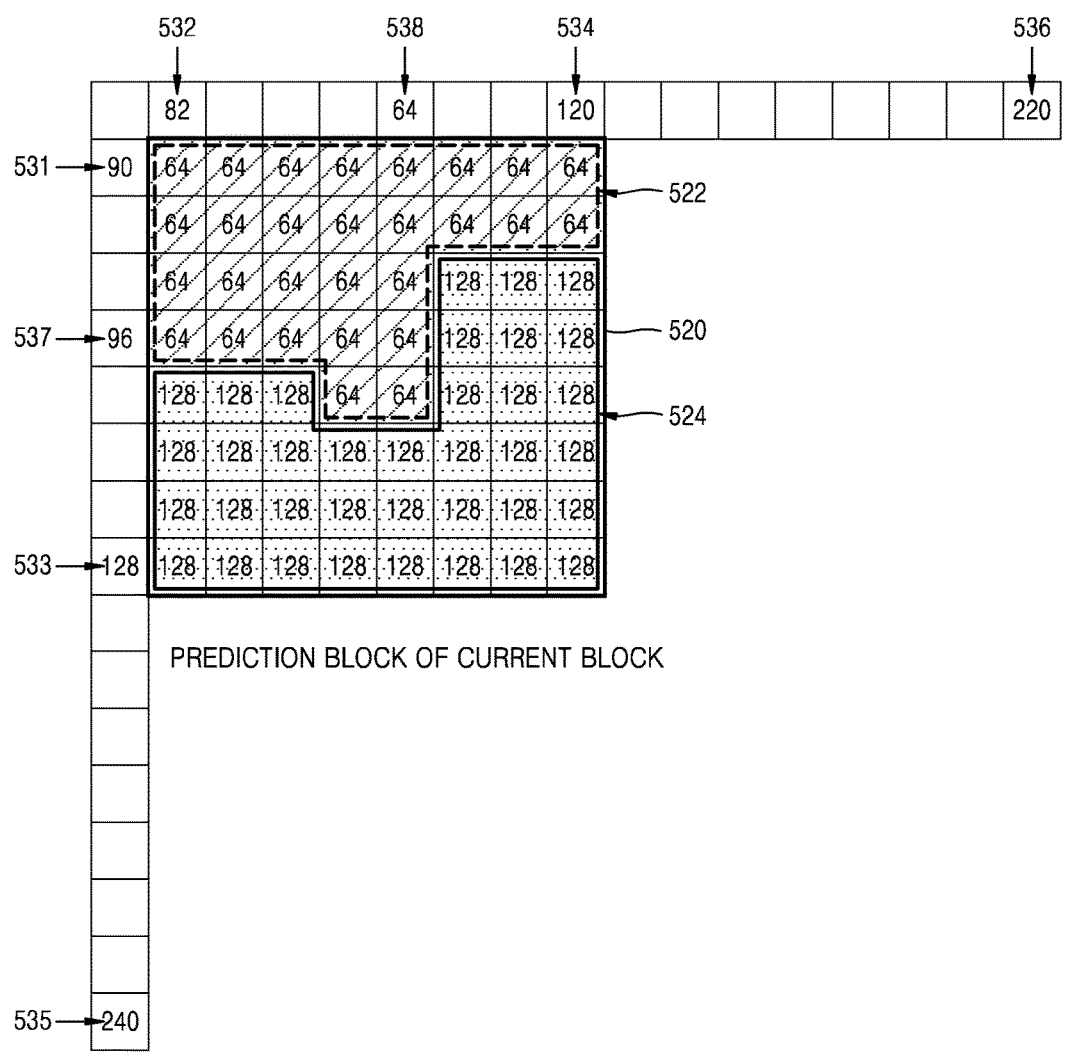
FIG. 5C illustrates a current block for describing a video decoding apparatus according to an embodiment.

FIG. 5C illustrates a current block 520 having a 8×8 size that splits into two partitions and reference samples 531 through 536 of the current block 520. The current block 520 includes a first partition 522 and a second partition 524. Since a sample value of a binary sample located at (0,0) of the binary map 510 is 0, an area corresponding to binary samples having a sample value of 0 is determined as the first partition 522. To the contrary, an area corresponding to binary samples having a sample value of 1 is determined as the second partition 524.

The prediction value determiner 120 may determine prediction values with respect to a plurality of partitions. A depth image includes information about an approximate value between a current view and a surface of an object. Thus, there is a high possibility that the depth image has almost the same sample value as that of a specific region unlike a texture image. Therefore, for efficiency of encoding, the prediction value determiner 120 may determine all prediction values of samples included in partitions as the same value. Thus, when determined partitions are 2, samples included in the first partition have a first prediction value, and samples included in the second partition have a second prediction value.

The prediction value determiner 120 may determine prediction values of partitions based on reference samples adjacent to a current block and a binary map. According to an embodiment, the prediction value determiner 120 may compare sample values of binary samples included in the binary map and determine the prediction value of the partition based on a result of the comparison. For example, in a binary map having an N×N size, a result (hereinafter referred to as a "horizontal edge flag") of comparing a binary sample located at (0,0) and a binary sample located at (N−1,0) may be used to determine the prediction value of the partition. Likewise, a result (hereinafter referred to as a "vertical edge flag") of comparing the binary sample located at (0,0) and a binary sample located at (0,N−1) may be used to determine the prediction value of the partition.

According to an embodiment, the horizontal edge flag may be determined as 0 when the binary sample located at (0,0) and the binary sample located at (N−1,0) are the same. To the contrary, the horizontal edge flag may be determined as 1 when the binary sample located at (0,0) and the binary sample located at (N−1,0) are different.

According to an embodiment, the vertical edge flag may be determined as 1 when the binary sample located at (0,0) and the binary sample located at (N−1,0) are the same. To the contrary, the vertical edge flag may be determined as 0 when the binary sample located at (0,0) and the binary sample located at (N−1,0) are different.

For example, sample values of the binary sample 512 located at (0,0) of the binary map 510 and the binary sample 514 located at (7,0) of the binary map 510 are both 0. Thus, a horizontal flag with respect to the binary map 510 is determined as 0.

The sample value of the binary sample 512 located at (0,0) of the binary map 510 is 0. The sample value of the binary sample 514 located at (7,0) of the binary map 510 is 1. Thus, a vertical flag with respect to the binary map 510 is determined as 1.

According to an embodiment, the prediction value determiner 120 may determine reference samples used to determine the prediction value of the partition according to a result of comparing binary samples of a specific location. For example, reference samples used to determine the prediction value of the partition may be determined according to a horizontal edge flag and a vertical edge flag of a binary map.

According to an embodiment, when values of the horizontal edge flag and the vertical edge flag are 1, the prediction value determiner 120 may determine an average value of a reference sample located at (−1,0) and a reference sample located at (0,−1) as a prediction value of a first prediction. The prediction value determiner 120 may also determine an average value of a reference sample located at (−1,N−1) and a reference sample located at (N−1,−1) as a prediction value of a second prediction.

Specifically, for example, if the values of the horizontal edge flag and the vertical edge flag are 1 in FIG. 5C, the prediction value determiner 120 may determine an average value of the reference sample 531 located at (−1,0) and the reference sample 532 located at (0,−1) as the prediction value of the first prediction. The prediction value determiner 120 may also determine an average value of the reference sample 533 located at (−1,7) and the reference sample 534 located at (7,−1) as the prediction value of the second prediction.

According to an embodiment, when values of the horizontal edge flag and the vertical edge flag are 0, the prediction value determiner 120 may determine the average value of the reference sample located at (−1,0) and the reference sample located at (0,−1) as the prediction value of the first prediction. The prediction value determiner 120 may also determine a sample value of a reference sample located at (−1,2N−1) or a reference sample located at (2N−1,−1) as the prediction value of the second prediction.

Specifically, for example, if the values of the horizontal edge flag and the vertical edge flag are 0 in FIG. 5C, the prediction value determiner 120 may determine an average value of the reference sample 531 located at (−1,0) and the reference sample 532 located at (0,−1) as the prediction value of the first prediction. The prediction value determiner 120 may also determine a sample value of the reference sample 535 located at (−1,15) and the reference sample 536 located at (15,−1) as the prediction value of the second prediction.

According to an embodiment, when the value of the horizontal edge flag is 1, and the value of the vertical edge flag is 0, the prediction value determiner 120 may determine a sample value of a reference sample located at (−1,N/2-1) as the prediction value of the first partition. The prediction value determiner 120 may also determine a sample value of a reference sample located at (N−1,−1) as the prediction value of the second partition.

Specifically, for example, when the value of the horizontal edge flag is 1, and the value of the vertical edge flag is 0, the prediction value determiner 120 may determine a sample value of the reference sample 537 located at (−1,3) as the prediction value of the first partition. The prediction value determiner 120 may also determine a sample value of the reference sample 534 located at (7,−1) as the prediction value of the second partition.

According to an embodiment, when the value of the horizontal edge flag is 0, and the value of the vertical edge flag is 1, the prediction value determiner 120 may determine a sample value of a reference sample located at (N/2-1,−1) as the prediction value of the first partition. The prediction value determiner 120 may also determine a sample value of a reference sample located at (−1,N−1) as the prediction value of the second partition.

Specifically, for example, when the value of the horizontal edge flag is 1, and the value of the vertical edge flag is 0, the prediction value determiner 120 may determine a sample value of the reference sample 538 located at (3,−1) as the prediction value of the first partition. The prediction value determiner 120 may also determine a sample value of the reference sample 533 located at (−1,7) as the prediction value of the second partition.

The horizontal edge flag and the vertical edge flag determined by the binary map 510 of FIG. 5B are respectively 0 and 1, the prediction value determiner 120 may determine a prediction value of the first partition 522 and a prediction value of the second partition 524 as the sample value of the reference sample 538 located at (3, −1) and a sample value of the reference sample 533 located at (−1,7) respectively. Thus, all prediction values of samples included in the first partition 522 have the sample value as that of the reference sample 538, and all prediction values of samples included in the second partition 524 have the sample value as that of the reference sample 533.

The prediction value determiner 120 may obtain offset information with respect to a current block and determine prediction values of samples included in partitions based on the offset information. For example, the prediction value determiner 120 may adjust a prediction value of a first partition by adding a first offset value to the prediction value of the first partition. Likewise, the prediction value determiner 120 may adjust a prediction value of a second partition by adding a second offset value to the prediction value of the second partition.

The video decoding apparatus 100 may include a bitstream receiver (not shown) receiving a bitstream including encoding information.

FIG. 1B is a flowchart of a video decoding method 10 according to an embodiment. Specifically, FIG. 1B is a flowchart of a method of performing an embodiment of an intra-contour mode.

In operation 11, a reference value that is a reference for splitting a current block of a depth image corresponding to a texture image is determined from reference samples of a reference block included in the texture image. According to embodiments, the reference value may be determined according to reference samples of a predetermined location of the reference block. For example, an average value of the reference sample 502 located at (0,0), the reference sample 504 located at (N−1,0), the reference sample 506 located at (0,N−1), and the reference sample 508 located at (N−1,N−1) may be determined as the reference value. As another example, an average value of all reference samples included in the reference block may be determined as the reference value.

In operation 12, a binary map of the current block is determined by comparing the reference value and reference samples of the current block. A value of a binary sample included in the binary map is determined according to a result of comparing a reference sample corresponding to the binary sample and the reference value.

In operation 13, the current block splits into a plurality of partitions based on the binary map. A first partition is determined as an area corresponding to binary samples having the same sample value as that of a binary sample located at (0,0) of the binary map. A second partition is determined as an area corresponding to binary samples having different sample values from the binary sample located at (0,0) of the binary map.

In operation 14, prediction values of the plurality of partitions are determined based on the reference samples of the current block and the binary map. According to an embodiment, a vertical edge flag and a horizontal edge flag may be obtained by comparing adjacent samples of the current block. The reference samples of the current block may be determined according to the vertical edge flag and the horizontal edge flag. When there is offset information with respect to the current block, the prediction values of the partitions may be determined according to the offset information.

Figure 2A:
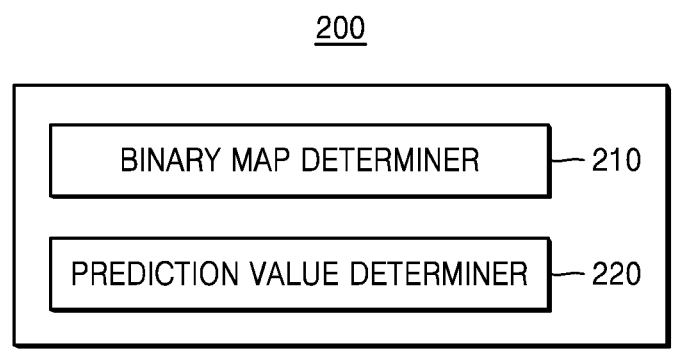
FIG. 2A is a block diagram of a video encoding apparatus according to an embodiment.

FIG. 2A is a block diagram of a video encoding apparatus 200 according to an embodiment. Specifically, FIG. 2A is a block diagram of an apparatus for performing an embodiment of an intra-contour mode.

The video encoding apparatus 200 may include a binary map determiner 210 and a prediction value determiner 220. Although the binary map determiner 210 and the prediction value determiner 220 are illustrated as separate configuration units in FIG. 2A, the binary map determiner 210 and the prediction value determiner 220 may be combined and implemented as the same configuration unit according to an embodiment.

Although the binary map determiner 210 and the prediction value determiner 220 are illustrated as configuration units located in one apparatus in FIG. 2A, apparatuses for performing functions of the binary map determiner 210 and the prediction value determiner 220 may not be necessarily adjacent to each other physically. Thus, the binary map determiner 210 and the prediction value determiner 220 may be scattered according to an embodiment.

The binary map determiner 210 and the prediction value determiner 220 of FIG. 2A may be implemented as one processor according to an embodiment. Also, the binary map determiner 210 and the prediction value determiner 220 may be implemented as a plurality of processors according to an embodiment.

The video encoding apparatus 200 may include a storage (not shown) for storing data generated by the binary map determiner 210 and the prediction value determiner 220. Also, the binary map determiner 210 and the prediction value determiner 220 may extract and use the stored data from the storage (not shown).

The video encoding apparatus 200 of FIG. 2A is not limited to a physical apparatus. For example, some of functions of the video encoding apparatus 200 may be implemented as software rather than hardware.

The binary map determiner 210 and the prediction value determiner 220 included in the video encoding apparatus 200 may determine a binary map and determine prediction values of partitions of a current block that splits according to the binary map in the same manner as the binary map determiner 110 and the prediction value determiner 120 of the video decoding apparatus 100.

Figure 2B:
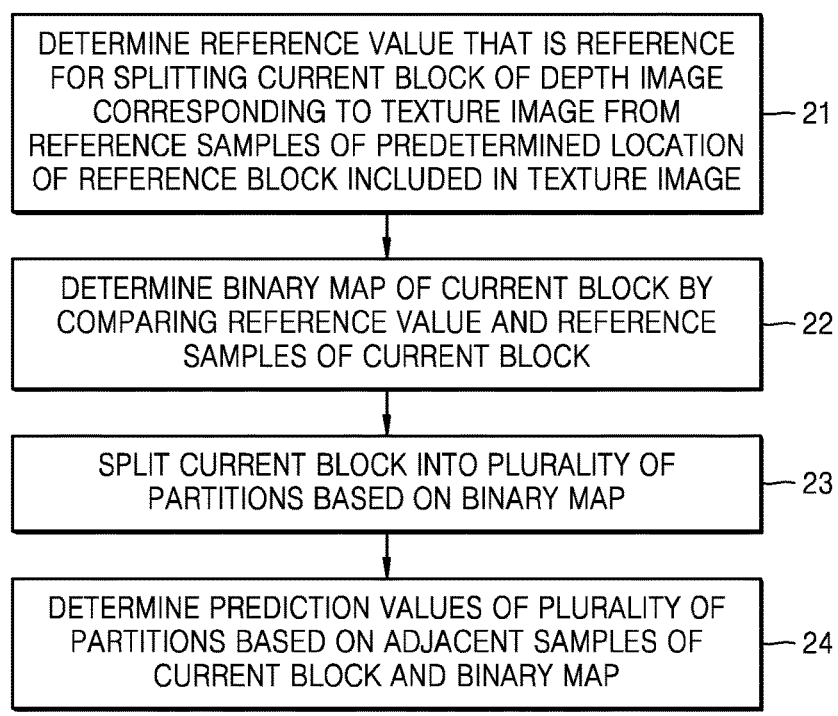
FIG. 2B is a flowchart of a video encoding method according to an embodiment.

FIG. 2B is a flowchart of a video encoding method according to an embodiment. Specifically, FIG. 2B is a flowchart of a method of performing an embodiment of an intra-contour mode.

In operation 21, a reference value that is a reference for splitting a current block of a depth image corresponding to a texture image is determined from reference samples of a reference block included in the texture image. According to embodiments, the reference value may be determined according to reference samples of a predetermined location of the reference block.

In operation 22, a binary map of the current block is determined by comparing the reference value and reference samples of the current block.

In operation 23, the current block splits into a plurality of partitions based on the binary map.

In operation 24, prediction values of the plurality of partitions are determined based on the reference samples of the current block and the binary map.

Figure 3A:
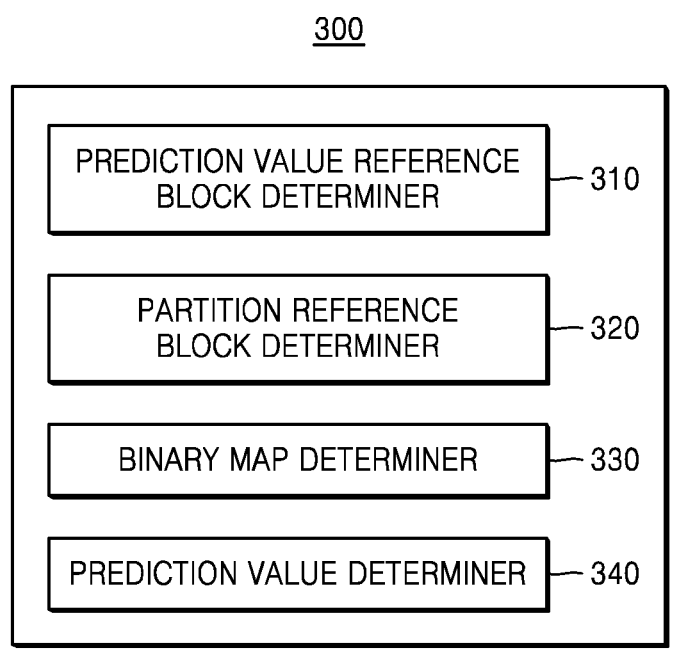
FIG. 3A is a block diagram of a video decoding apparatus according to an embodiment.

FIG. 3A is a block diagram of a video decoding apparatus 300 according to an embodiment. Specifically, FIG. 3A is a block diagram of an apparatus for performing an embodiment of a decoding method of determining a partition included in a current block of a texture image according to a partition reference block of a depth image in an inter mode.

The video decoding apparatus 300 may include a prediction value reference block determiner 310, a partition reference block determiner 320, a binary map determiner 330, and a prediction value determiner 340. Although the prediction value reference block determiner 310, the partition reference block determiner 320, the binary map determiner 330, and the prediction value determiner 340 are illustrated as separate configuration units in FIG. 3A, the prediction value reference block determiner 310, the partition reference block determiner 320, the binary map determiner 330, and the prediction value determiner 340 may be combined and implemented as the same configuration unit according to an embodiment.

Although the prediction value reference block determiner 310, the partition reference block determiner 320, the binary map determiner 330, and the prediction value determiner 340 are illustrated as configuration units located in one apparatus in FIG. 3A, apparatuses for performing functions of the prediction value reference block determiner 310, the partition reference block determiner 320, the binary map determiner 330, and the prediction value determiner 340 may not be necessarily adjacent to each other physically. Thus, the prediction value reference block determiner 310, the partition reference block determiner 320, the binary map determiner 330, and the prediction value determiner 340 may be scattered according to an embodiment.

The prediction value reference block determiner 310, the partition reference block determiner 320, the binary map determiner 330, and the prediction value determiner 340 of FIG. 3A may be implemented as one processor according to an embodiment. Also, the prediction value reference block determiner 310, the partition reference block determiner 320, the binary map determiner 330, and the prediction value determiner 340 may be implemented as a plurality of processors according to an embodiment.

The video decoding apparatus 300 may include a storage (not shown) for storing data generated by the prediction value reference block determiner 310, the partition reference block determiner 320, the binary map determiner 330, and the prediction value determiner 340. Also, the prediction value reference block determiner 310, the partition reference block determiner 320, the binary map determiner 330, and the prediction value determiner 340 may extract and use the stored data from the storage (not shown).

The video decoding apparatus 300 of FIG. 3A is not limited to a physical apparatus. For example, some of functions of the video decoding apparatus 300 may be implemented as software rather than hardware.

Figure 6A:
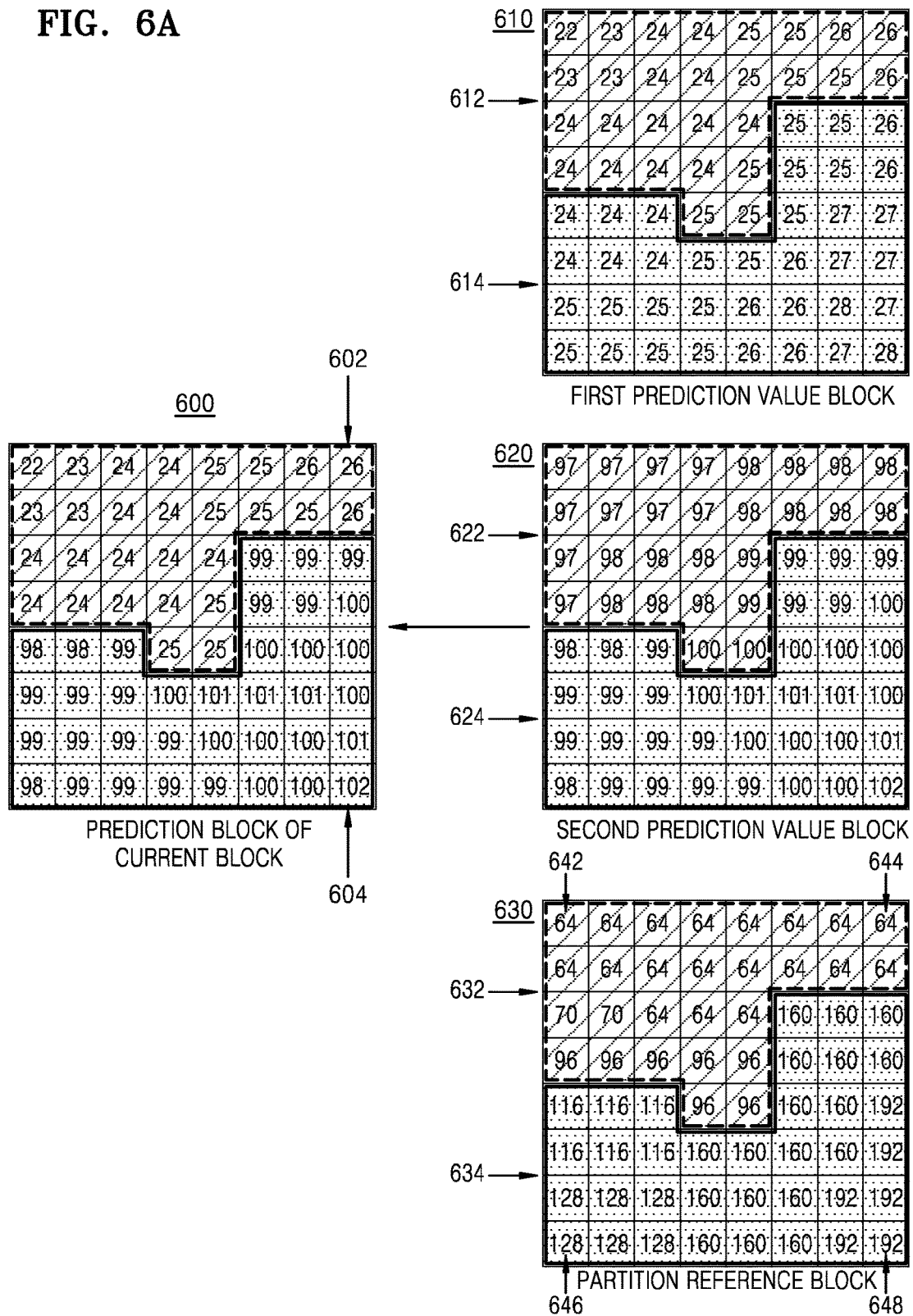
FIG. 6A illustrates a current block and reference blocks referred to by the current block for describing a video decoding apparatus according to an embodiment.
Figure 6B:
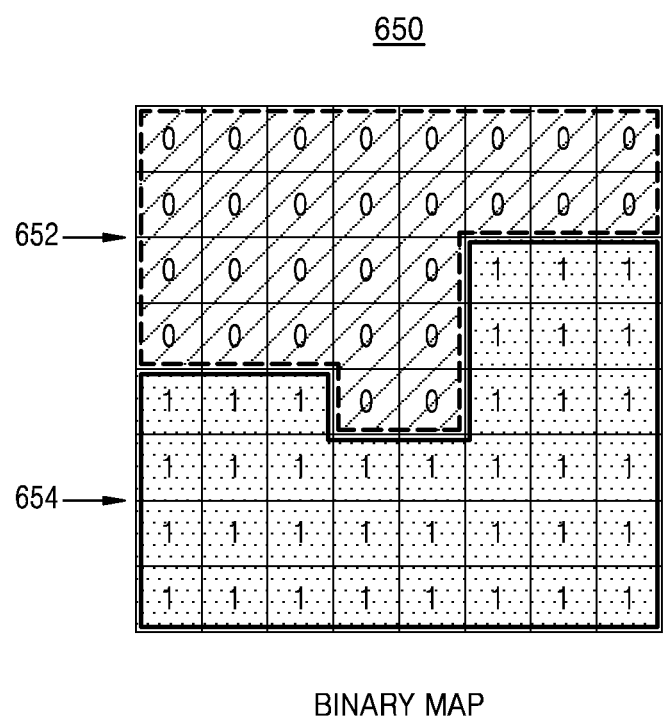
FIG. 6B illustrates a binary map for describing a video decoding apparatus according to an embodiment.

Descriptions provided with reference to FIGS. 6A and 6B are given so as to describe an embodiment of a decoding method performed by the video decoding apparatus 300 of FIG. 3A. FIG. 6A illustrates a current block 600 having an 8×8 size and reference blocks 610, 620, and 630 referred to by the current block 600. The reference blocks 610, 620, and 630 of FIG. 6A include a first prediction value reference block 610, a second prediction value reference block 620, and a partition reference block 630. FIG. 6B illustrates a binary map 650 having an 8×8 size determined based on the partition reference block 630. The current block 600, the reference blocks 610, 620, and 630, and the binary map 650 have a block shape having an N×N size. The current block 600, the reference blocks 610, 620, and 630, and the binary map 650 are described with constituents of the video decoding apparatus 300 of FIG. 3A.

The prediction value reference block determiner 310 determines a prediction value reference block corresponding to a partition included in a current block of a texture image. The prediction value reference block is a reference block used to determine a prediction value of a sample included in the partition. Thus, the prediction value reference block is included in the texture image that does not include the current block.

The prediction value reference block determiner 310 may determine a prediction block according to a reference index indicating a motion vector corresponding to the partition and a reference image referred to by the partition. The reference index indicates a reference image of another POC at the same view. The motion vector indicates a displacement between a coordinate of the current block and a coordinate of the prediction value reference block.

The prediction value reference block determiner 310 may determine the prediction block based on a reference view index indicating a disparity vector corresponding to the partition and a reference view image referred to by the partition. The reference view index indicates a reference image of a different view in the same POC. The disparity vector indicates a view disparity between the coordinate of the current block and the coordinate of the prediction value reference block.

When partitions of the current block are 2, the prediction value reference block determiner 310 may determine a first prediction value reference block corresponding to a first partition included in the current block and a second prediction value reference block corresponding to a second partition. The first prediction value reference block may be used to determine prediction values of samples included in the first partition. Likewise, the second prediction value reference block may be used to determine prediction values of samples included in the second partition.

For example, a first prediction value reference block 610 of FIG. 6A corresponds to a first partition of the current block 600. A second prediction value reference block 620 corresponds to a second partition of the current block 600.

The first prediction value reference block 610 may be determined according to a first reference index indicating a first motion vector corresponding to the first partition and a reference image referred to by the first partition or may be determined according to a first reference view index indicating a first display vector corresponding to the first partition and a reference view image referred to by the first partition.

The second prediction value reference block 620 may be determined according to a second reference index indicating a second motion vector corresponding to the second partition and a reference image referred to by the second partition or may be determined according to a second reference view index indicating a second display vector corresponding to the second partition and a reference view image referred to by the second partition.

The partition reference block determiner 320 determines a reference block corresponding to the current block from the depth image of a different view from the texture image. The partition reference block is a reference block used to determine a partition of the current block. The partition reference block includes a depth image of an earlier reconstructed view than a current view.

The partition reference block determiner 320 may determine the partition reference block based on a reference view index indicating a disparity vector corresponding to the partition and a reference view image referred to by the current block. The reference view index indicates a reference image of a different view in the same POC. The disparity vector indicates a view disparity between a coordinate of the current block and a coordinate of the partition reference block. The reference view index used by the partition reference block determiner 320 may not be the same as the reference view index used by the prediction value reference block determiner 310. Likewise, the disparity vector used by the partition reference block determiner 320 may not be the same as the disparity vector used by the prediction value reference block determiner 310.

For example, the partition reference block 630 of FIG. 6A is used to determine areas of the first partition and the second partition of the current block 600. The partition reference block 630 may be determined according to a third reference view index indicating a third disparity vector corresponding to the current block and a reference view image referred to by the current block to determine a partition.

The binary map determiner 330 determines a reference value that is a reference for splitting the current block from reference samples of a predetermined location of the partition reference block, compares the reference value and the partition reference samples of the partition reference block, and determines a binary map of the current block.

The binary map determiner 330 determines the reference value from the partition reference samples included in the partition reference block. According to an embodiment, the binary map determiner 330 may determine a depth sample included in the partition reference block as a partition reference sample. According to an embodiment, the binary map determiner 330 may determine an average value of all depth samples of the partition reference block as the reference value. According to another embodiment, the binary map determiner 330 may determine an average value of the reference samples of the predetermined location of the partition reference block as the reference value. As an example of the predetermined location, an average value of 4 partition reference samples located at apexes of the partition reference block may be determined as the reference value. Thus, an average value of a reference sample located at (0,0), a reference sample located at (N−1,0), a reference sample located at (0,N−1), and a reference sample located at (N−1,N−1) in the partition reference block having the N×N size is determined as the reference value. Methods of determining the reference value are merely some of various embodiments. The reference value may be determined by using different methods. An embodiment of a method of determining the reference values is described below by using the partition reference block 630 of FIG. 6A.

For example, the binary map determiner 330 may determine an average value of a reference sample 642 located at (0,0) of the partition reference block 630, a reference sample 644 located at (7,0), a reference sample 646 located at (0,7), and a reference sample 648 located at (7,7) as the reference value. An a specific example, when values of the reference sample 642 located at (0,0), the reference sample 644 located at (7,0), the reference sample 646 located at (0,7), and the reference sample 648 located at (7,7) are respectively 64, 64, 128, and 192, 112 may be determined as the reference value.

The binary map determiner 330 may determine a binary map of the current block by comparing the reference value and reference samples of the reference block. The binary map includes binary sample. A sample value of a binary sample is determined according to a result of comparing the partition reference sample and the reference value. According to an embodiment, when the reference value is greater than a sample value of the partition reference sample, a value of a binary sample corresponding to the partition reference sample may be determined as 1. To the contrary, when the reference value is smaller than the sample value of the partition reference sample, the value of the binary sample corresponding to the partition reference sample may be determined as 0. A method of determining the binary map is merely an embodiment. The binary map may be determined by using another method. An embodiment of the binary map is illustrated in FIG. 6B.

Binary samples of the binary map 650 of FIG. 6B has a value of 0 or 1. Binary samples 652 having the value of 1 are located at a left top end of the binary map 650. Binary samples 654 having the value of 0 are located at a right bottom end of the binary map 650. The partition of the current block is determined according to a distribution of the binary samples.

The prediction value determiner 340 may split the current block into a plurality of partitions based on the binary map determined by the binary map determiner 330. According to an embodiment, the prediction value determiner 340 may determine an area of a first partition corresponding to binary samples having the same sample value as a binary sample located at (0,0) of the binary map. The prediction value determiner 340 may also determine an area of a second partition corresponding to binary samples having different sample values from the binary sample located at (0,0) of the binary map. Thus, the first partition includes samples located at (0,0) of the current block.

As a specific example, areas of the first partition and the second partition of the current block 600 of FIG. 6A are determined according to the binary map 650 of FIG. 6B. Since a value of the binary sample located at (0,0) of the binary map is 1, the area of the first partition is determined based on an area in which binary samples having a sample value of 1 are located. To the contrary, the area of the second partition is determined based on an area in which binary samples having a sample value of 0 are located.

The prediction value determiner 340 may determine prediction values with respect to samples included in the partition. According to an embodiment, the prediction value determiner 340 may determine sample values of samples included in the area of the first partition from a first prediction value reference block. The prediction value determiner 340 may determine sample values of samples included in the area of the second partition from a second prediction value reference block.

For example, sample values of the first partition of the current block 600 of FIG. 6A are determined based on samples included in a first partition corresponding area 612. A prediction value of a sample located at (x,y) of the first partition may be determined as a sample value of a sample located at (x,y) of the first partition corresponding area 612. Thus, when a sample value of a sample located at (0,0) of the first partition corresponding area 612 is 128, a prediction value of a sample located at (0,0) of the first partition is determined as 128.

Likewise, sample values of the second partition of the current block 600 of FIG. 6A are determined based on samples included in the second partition corresponding area 624 of the second prediction value block 620. A prediction value of a sample located at (x,y) of the second partition may be determined as a sample value of a sample located at (x,y) of the second partition corresponding area 624. Thus, when a sample value of a sample located at (7,7) of the second partition corresponding area 624 is 64, a prediction value of a sample located at (7,7) of the first partition is determined as 64.

As a result, a first partition non-corresponding area 614 of the first prediction value block 601 and a second partition non-corresponding area 622 of the second prediction value block 620 are not used to predict the current block 600.

Figure 3B:
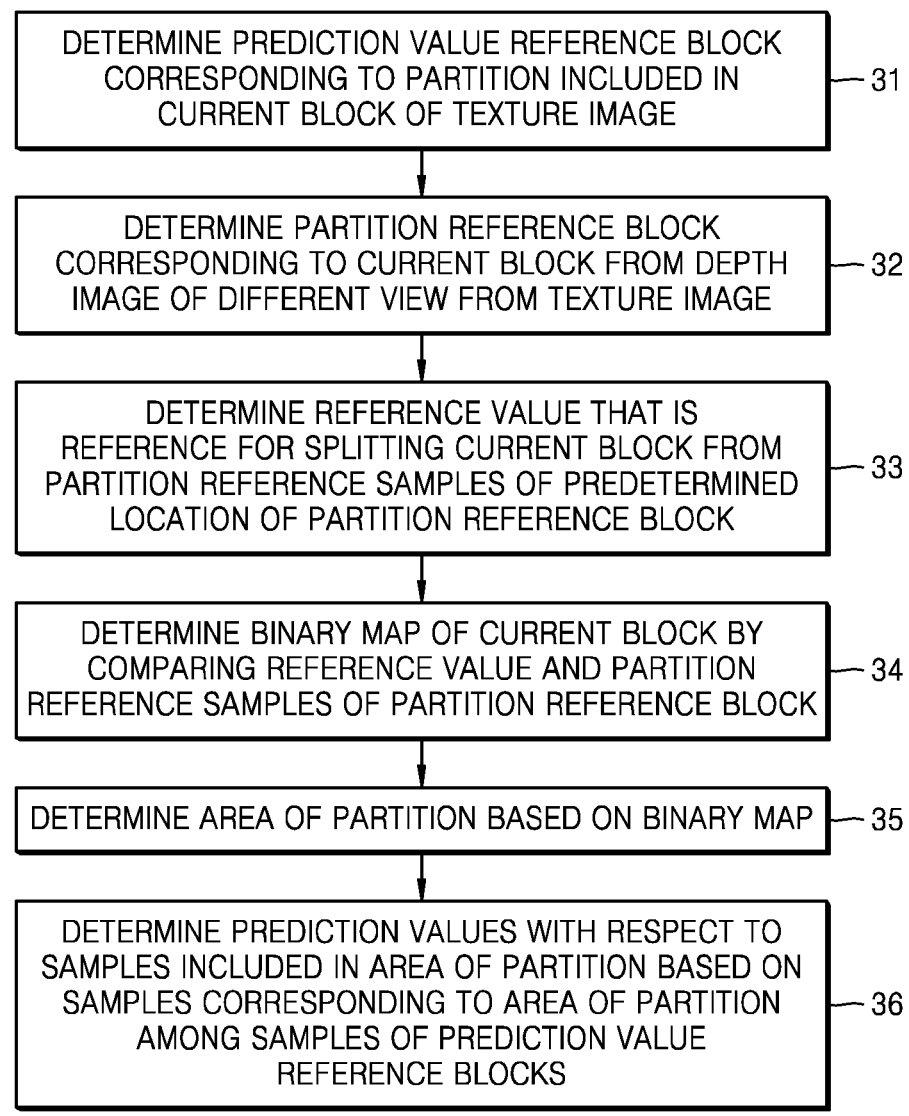
FIG. 3B is a flowchart of a video decoding method according to an embodiment.

FIG. 3B is a flowchart of a video decoding method 300 according to an embodiment. Specifically, FIG. 3B is a flowchart of an embodiment of a decoding method of determining a partition included in a current block of a texture image according to a partition reference block of a depth image in an inter mode.

In operation 31, a prediction value reference block corresponding to a partition included in a current block of a texture image is determined. The prediction value reference block may be determined based on a reference index indicating a motion vector corresponding to the partition and a reference image referred to by the partition or a reference view index indicating a disparity vector corresponding to the partition and a reference view image referred to by the partition.

In operation 32, a partition reference block corresponding to the current block is determined from a depth image of a different view from the texture image. The partition reference block may be determined based on a reference view index indicating a disparity vector corresponding to the current block and a reference view image referred to by the current block.

In operation 33, a reference value that is a reference for splitting the current block is determined from partition reference samples of a predetermined location of the partition reference block. According to an embodiment, an average value of partition reference samples located at apexes of the partition reference block may be determined as the reference value.

In operation 34, a binary map of the current block is determined by comparing the reference value and the partition reference samples of the partition reference block. According to whether the partition reference sample is greater than the reference value, a sample of the binary map corresponding to the partition reference sample is determined.

In operation 35, an area of the partition is determined based on the binary map.

In operation 36, prediction values with respect to samples included in the area of the partition are determined based on samples corresponding to the area of the partition among samples of prediction value reference blocks.

Figure 4A:
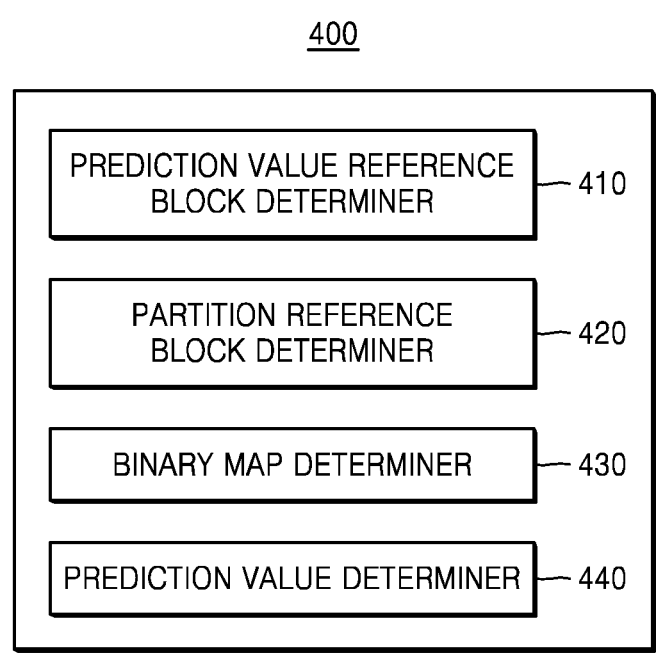
FIG. 4A is a block diagram of a video encoding apparatus according to an embodiment.

FIG. 4A is a block diagram of a video encoding apparatus 400 according to an embodiment. Specifically, FIG. 4A is a block diagram of an apparatus for performing an embodiment of a decoding method of determining a partition included in a current block of a texture image according to a partition reference block of a depth image in an inter mode.

The video encoding apparatus 400 may include a prediction value reference block determiner 410, a partition reference block determiner 420, a binary map determiner 430, and a prediction value determiner 440. Although the prediction value reference block determiner 410, the partition reference block determiner 420, the binary map determiner 430, and the prediction value determiner 440 are illustrated as separate configuration units in FIG. 4A, the prediction value reference block determiner 410, the partition reference block determiner 420, the binary map determiner 430, and the prediction value determiner 440 may be combined and implemented as the same configuration unit according to an embodiment.

Although the prediction value reference block determiner 410, the partition reference block determiner 420, the binary map determiner 430, and the prediction value determiner 440 are illustrated as configuration units located in one apparatus in FIG. 4A, apparatuses for performing functions of the prediction value reference block determiner 410, the partition reference block determiner 420, the binary map determiner 430, and the prediction value determiner 440 may not be necessarily adjacent to each other physically. Thus, the prediction value reference block determiner 410, the partition reference block determiner 420, the binary map determiner 430, and the prediction value determiner 440 may be scattered according to an embodiment.

The prediction value reference block determiner 410, the partition reference block determiner 420, the binary map determiner 430, and the prediction value determiner 440 of FIG. 4A may be implemented as one processor according to an embodiment. Also, the prediction value reference block determiner 410, the partition reference block determiner 420, the binary map determiner 430, and the prediction value determiner 440 may be implemented as a plurality of processors according to an embodiment.

The video encoding apparatus 400 may include a storage (not shown) for storing data generated by the prediction value reference block determiner 410, the partition reference block determiner 420, the binary map determiner 430, and the prediction value determiner 440. Also, the prediction value reference block determiner 410, the partition reference block determiner 420, the binary map determiner 430, and the prediction value determiner 440 may extract and use the stored data from the storage (not shown).

The video encoding apparatus 400 of FIG. 4A is not limited to a physical apparatus. For example, some of functions of the video encoding apparatus 400 may be implemented as software rather than hardware.

The prediction value reference block determiner 410, the partition reference block determiner 420, the binary map determiner 430, and the prediction value determiner 440 included in the video encoding apparatus 400 may determine a prediction value reference block and a partition reference block, determine a binary map according to the partition reference block, and determine a prediction value with respect to a partition of a current block that splits according to the binary map in the same manner as the prediction value reference block determiner 310, the partition reference block determiner 320, the binary map determiner 330, and the prediction value determiner 340 of the video decoding apparatus 300.

Figure 4B:
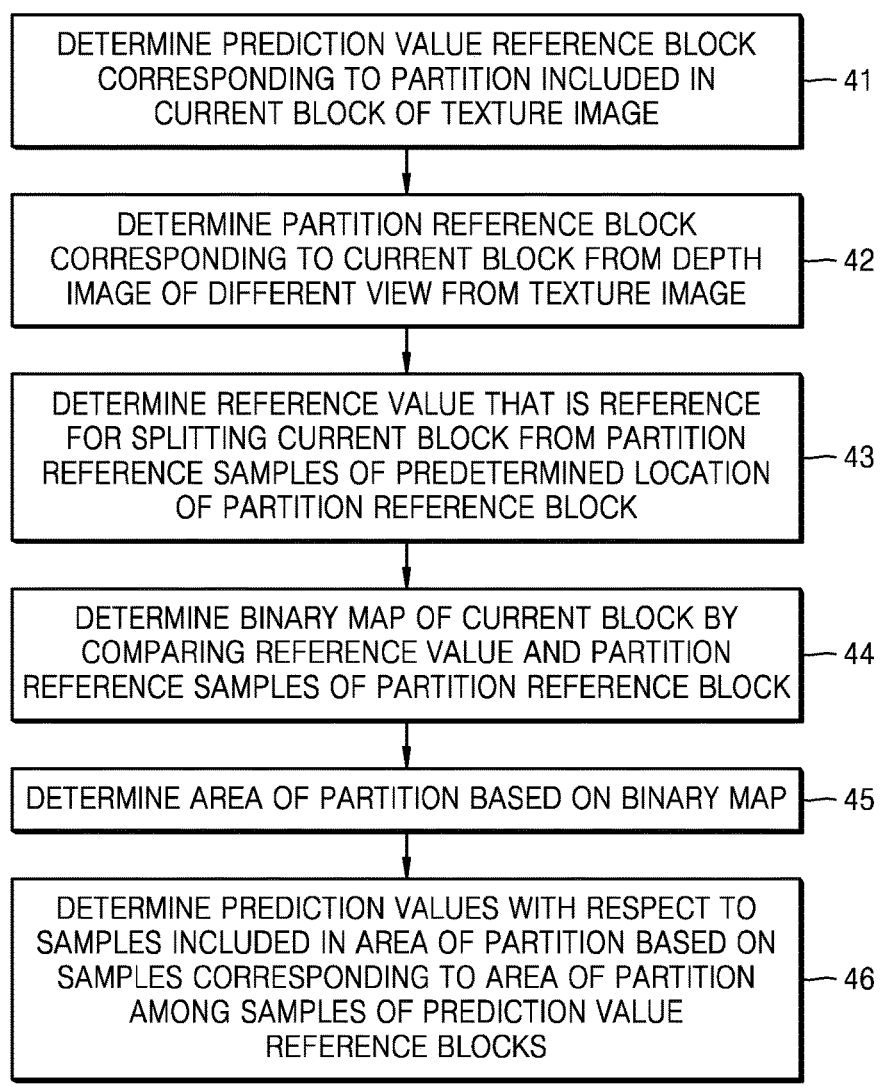
FIG. 4B is a flowchart of a video encoding method according to an embodiment.

FIG. 4B is a flowchart of a video encoding method 40 according to an embodiment. Specifically, FIG. 4B is a flowchart of an embodiment of a decoding method of determining a partition included in a current block of a texture image according to a partition reference block of a depth image in an inter mode.

In operation 41, a prediction value reference block corresponding to a partition included in a current block of a texture image is determined.

In operation 42, a partition reference block corresponding to the current block is determined from a depth image of a different view from the texture image.

In operation 43, a reference value that is a reference for splitting the current block is determined from partition reference samples of a predetermined location of the partition reference block.

In operation 44, a binary map of the current block is determined by comparing the reference value and the partition reference samples of the partition reference block.

In operation 45, an area of the partition is determined based on the binary map.

In operation 46, prediction values with respect to samples included in the area of the partition are determined based on samples corresponding to the area of the partition among samples of prediction value reference blocks.

The video encoding method 40 may perform the same prediction method as the video decoding method 30.

Figure 7:
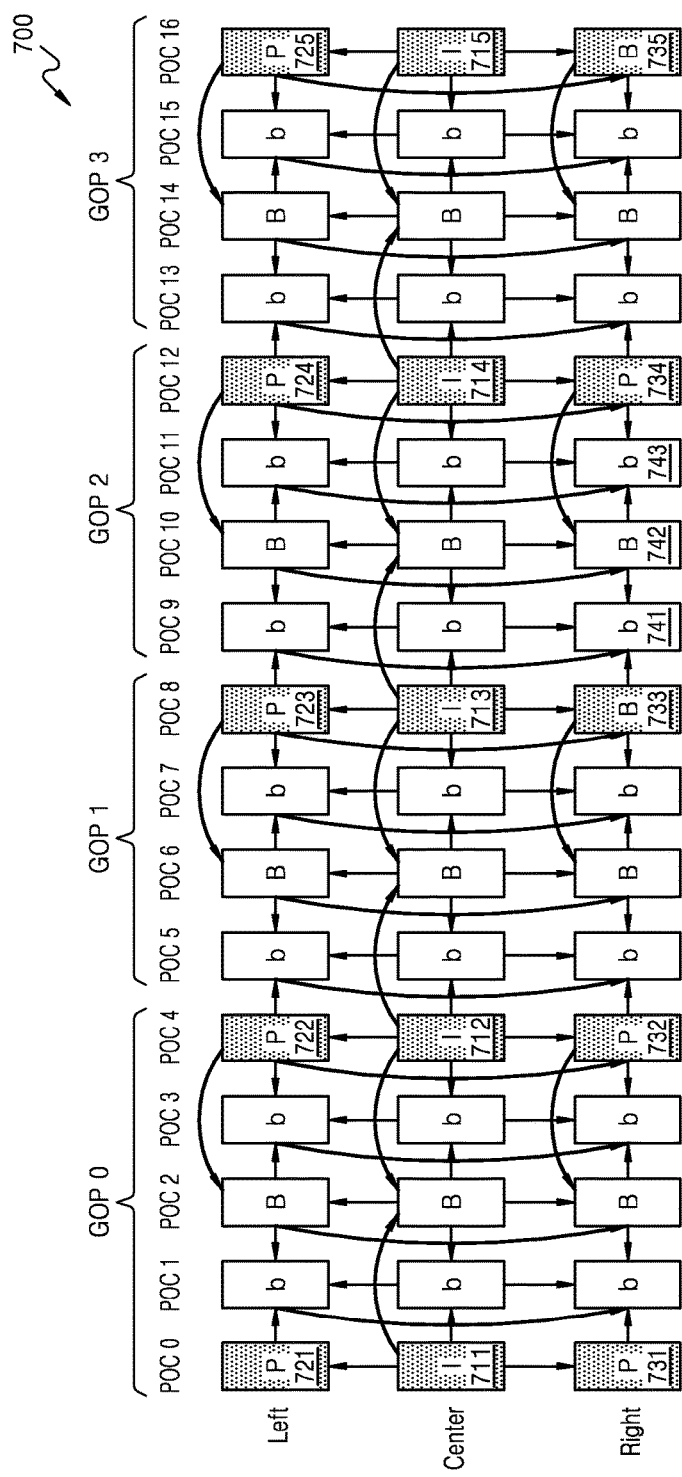
FIG. 7 illustrates a multi-view video prediction structure according to an embodiment.

FIG. 7 illustrates a multi-view video prediction structure according to an embodiment.

The video encoding apparatus 100 according to an embodiment may predict a base view image and dependent view images according to a reproduction order 700 of the multi-view video prediction structure shown in FIG. 7. In FIG. 7, although the base view images and two dependent view images are encoded, three or more dependent view images according to embodiments may be encoded.

According to the reproduction order 700 of the multi-view video prediction structure shown in FIG. 7, images of the same view may be arranged in a horizontal direction. Thus, left view images "Left" may be arranged in a line in the horizontal direction, center view images "Center" may be arranged in a line in the horizontal direction, and right view images "Right" may be arranged in a line in the horizontal direction. The center view images may be base view images, and the left view images and the right view images may be dependent view images according to embodiments. According to another embodiment, the left view images or the right view images may be the base view images.

In addition, pictures of the same picture order count (POC) are arranged in a vertical direction. The POC indicates a reproduction order of pictures included in a video. 'POC X' marked in the multi-view video prediction structure 700 indicates a relative reproduction order of pictures located in each column. A small value of X indicates an early reproduction order, and a large value thereof indicates a late reproduction order.

Therefore, based on the reproduction order 700 of the multi-view video prediction structure of FIG. 7, the left-view pictures marked as 'Left' are arranged based on the POC in a horizontal direction, the base-view pictures marked as 'Center' are arranged based on the POC in a horizontal direction, and the right-view pictures marked as 'Right' are arranged based on the POC in a horizontal direction. A left-view picture and a right-view picture located at the same column as a base-view picture have different views but have the same POC.

In FIG. 7, per view, four sequential pictures configure one group of pictures (GOP). Each GOP includes pictures located between two sequential anchor pictures, and one anchor picture (key picture). According to embodiments, the GOP may include pictures more than four pictures. Also, according to embodiments, different numbers of pictures may be included in each GOP. The number of pictures included in the GOP may be determined according to encoding/decoding efficiency.

An anchor picture is a random access point (RAP) picture. When a video is reproduced, at a certain reproduction order, that is, if a reproduction location is arbitrarily selected among the pictures arranged based on the POC, an anchor picture which is the closest to the reproduction location in POC is reproduced. The base-view pictures include base-view anchor pictures 711, 712, 713, 714, and 715, the left-view pictures include left-view anchor pictures 721, 722, 723, 724, and 725, and the right-view pictures include right-view anchor pictures 731, 732, 733, 734, and 735. The anchor picture shown in FIG. 7 is merely an example and may be located in a different POC according to encoding/decoding efficiency.

The multi-view pictures may be reproduced and predicted (reconstructed) in the order of the GOPs. Initially, according to the reproduction order 700 of the multi-view video prediction structure, per view, the pictures included in GOP 0 may be reproduced and then the pictures included in GOP 1 may be reproduced. That is, the pictures included in every GOP may be reproduced in the order of GOP 0, GOP 1, GOP 2, and GOP 3. In addition, based on a coding order of the multi-view video prediction structure, per view, the pictures included in GOP 0 may be predicted (reconstructed) and then the pictures included in GOP 1 may be predicted (reconstructed). That is, the pictures included in every GOP may be predicted (reconstructed) in the order of GOP 0, GOP 1, GOP 2, and GOP 3.

An inter prediction by the multi-view video prediction structure 700 includes a motion-compensated prediction (MCP) and a disparity-compensated prediction (DCP). MCP is an inter prediction that uses pictures located in temporally front and back of a current picture at the same view as reference pictures. When a current block is predicted by MCP, a prediction unit of the current picture is determined according to a motion vector and a reference picture index with respect to the prediction unit of the current picture. DCP is an inter prediction that uses pictures of different views in the same POC as reference pictures. When the current block is predicted by DCP, the prediction unit of the current picture is determined according to a disparity vector and a reference picture index with respect to the prediction unit of the current picture. In FIG. 7, a picture from which an arrow starts is a reference picture, and a picture to which the arrow is directed is a picture to be predicted by using the reference picture.

A result of predicting the base-view pictures may be encoded and then output in the form of a base-view bitstream, and a result of predicting the dependent-view pictures may be encoded and then output in the form of a dependent-view bitstream. For example, a result of prediction-encoding the center view pictures in FIG. 7 may be output in the form of a base view bitstream, a result of prediction-encoding the left-view pictures may be output in the form of a first dependent bitstream, and a result of prediction-encoding the right-view pictures may be output in the form of a second dependent bitstream Only MCP is performed on the base-view pictures. Thus, only MCP is performed on the center view pictures. That is, although the I-type anchor pictures 711, 712, 713, 714, and 715 do not refer to other pictures, the other B-type and b-type pictures are predicted with reference to other base-view pictures. The B-type pictures are predicted with reference to I-type anchor pictures preceding the same in POC 7 and I-type anchor pictures following the same in POC 7. The b-type pictures are predicted with reference to I-type anchor pictures preceding the same in POC 7 and B-type pictures following the same in POC order, or with reference to B-type anchor pictures preceding the same in POC order and I-type anchor pictures following the same in POC 7.

On the left-view pictures and the right-view pictures, MVP or DCP is performed. Thus, the left view pictures may refer to the center view pictures of the same POC or the right view pictures of the same POC. Likewise, the right view pictures may refer to the center view pictures of the same POC or the left view pictures of the same POC.

Inter-view prediction (interlayer prediction) may be performed on the left-view anchor pictures 721, 722, 723, 724, and 725 with reference to the base-view anchor pictures 711, 712, 713, 714, and 715 corresponding thereto in POC. Inter-view prediction may be performed on the right-view anchor pictures 731, 732, 733, 734, and 735 with reference to the base-view anchor pictures 711, 712, 713, 714, and 715 or the left-view anchor pictures 721, 722, 723, 724, and 725 corresponding thereto in POC. In addition, inter-view prediction may be performed on left-view non-anchor pictures and right-view non-anchor pictures with reference to other-view pictures corresponding thereto in POC.

The left-view non-anchor pictures and the right-view non-anchor pictures may be predicted with reference to pictures of the same view. Thus, left-view non-anchor pictures and the right-view non-anchor pictures may be predicted by MCP or DCP.

The video decoding apparatuses 200 and 400 according to an embodiment may reconstruct the center-view pictures, the left-view pictures, and the right-view pictures based on the multi-view video prediction structure 700 illustrated in FIG. 7.

The prediction order of the pictures shown in FIG. 7 is merely an embodiment. The pictures may be predicted according to different prediction orders for encoding/decoding efficiency.

Figure 8A:
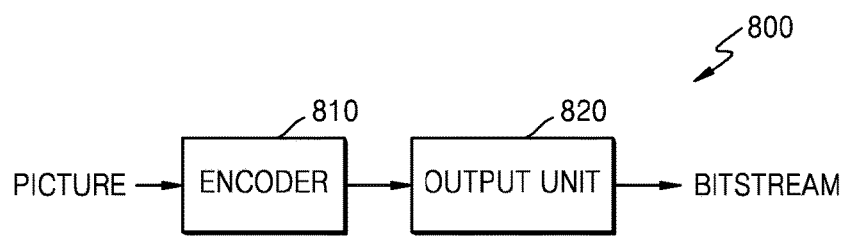
FIG. 8A is a block diagram of a video encoding apparatus based on coding units of a tree structure, according to an embodiment.

FIG. 8A is a block diagram of a video encoding apparatus based on coding units of a tree structure 800, according to an embodiment.

The video encoding apparatus involving video prediction based on coding units of the tree structure 800 includes an encoder 810 and an output unit 820. Hereinafter, for convenience of description, the video encoding apparatus involving video prediction based on coding units of the tree structure 800 is referred to as the 'video encoding apparatus 800'.

The encoder 810 may split a current picture based on a largest coding unit (maximum coding unit) that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The encoder 810 encodes at least one split region obtained by splitting a region of the largest coding unit according to depths, and determines a depth to output a finally encoded image data according to the at least one split region. That is, the encoder 810 determines an encoding depth by encoding the image data in the deeper coding units according to depths, according to the largest coding unit of the current picture, and selecting a depth having the least encoding error. The determined encoding depth and image data according to largest coding units are output to the output unit 820.

The image data in the largest coding unit is encoded based on the deeper coding units corresponding to at least one depth equal to or deeper than the maximum depth, and results of encoding the image data based on each of the deeper coding units are compared. A depth having the least encoding error may be selected after comparing encoding errors of the deeper coding units. At least one encoding depth may be selected for each largest coding unit.

The size of the largest coding unit is split as a coding unit is hierarchically split according to depths, and as the number of coding units increases. Even if coding units correspond to the same depth in one largest coding unit, it is also determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the encoding depths may differ according to regions in the image data. Thus, one or more encoding depths may be determined in one largest coding unit, and the image data of the largest coding unit may be divided according to coding units of at least one encoding depth.

Accordingly, the encoder 810 according to the embodiment may determine coding units having a tree structure included in the largest coding unit. The 'coding units having a tree structure' according to an embodiment include coding units corresponding to a depth determined to be the encoding depth, from among all deeper coding units included in the largest coding unit. A coding unit an encoding depth may be hierarchically determined according to depths in the same region of the largest coding unit, and may be independently determined in different regions. Equally, an encoding depth in a current region may be determined independently from an encoding depth in another region.

A maximum depth according to an embodiment is an index related to the number of splitting times from a largest coding unit to a smallest coding unit. A maximum depth according to an embodiment may denote the total number of splitting times from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, depth levels of depths 0, 1, 2, 3, and 4 exist, and thus the maximum depth may be set to 4.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. Hereinafter, for convenience of description, the prediction encoding and the transformation will be described based on a coding unit of a current depth in at least one largest coding unit.

The video encoding apparatus 800 according to the embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit of an encoding depth, i.e., based on the coding unit that is no longer split. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type may selectively include symmetrical partitions obtained by symmetrically splitting a height or width of the prediction unit, and may selectively include partitions obtained by asymmetrically splitting the height or width of the prediction unit, such as 1:n or n:1, partitions obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. The skip mode may also be performed only on the partition of 2N×2N. The encoding may be independently performed on one prediction unit in a coding unit, thereby selecting a prediction mode having a least encoding error.

The video encoding apparatus 800 according to the embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure, thus, residual data of the coding unit may be divided according to the transformation unit having the tree structure according to a transformation depth.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Encoding information according to encoding depths requires not only information about an encoding depth but also requires information related to prediction and transformation. Accordingly, the encoder 810 may determine not only a depth generating a least encoding error but may also determine a partition mode in which a prediction unit is split to partitions, a prediction type according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 15 through 24.

The encoder 810 may measure an encoding error of deeper coding units according to depths by using rate-distortion optimization based on Lagrangian multipliers.

The output unit 820 outputs, in bitstreams, the image data of the largest coding unit, which is encoded based on the at least one encoding depth determined by the encoder 810, and information about an encoding mode according to depths.

The encoded image data may correspond to a result obtained by encoding residual data of an image.

The information about the encoding mode according to depths may include encoding depth information, partition type information of the prediction unit, prediction mode information, and the size information of the transformation unit.

Encoding depth information may be defined by using split information according to depths, which specifies whether encoding is performed on coding units of a lower depth instead of a current depth. If the current depth of the current coding unit is an encoding depth, the current coding unit is encoded by using the coding unit of the current depth, and thus split information of the current depth may be defined not to split the current coding unit to a lower depth. On the contrary, if the current depth of the current coding unit is not the encoding depth, the encoding has to be performed on the coding unit of the lower depth, and thus the split information of the current depth may be defined to split the current coding unit to the coding units of the lower depth.

If the current depth is not the encoding depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of information about the encoding mode has to be determined for a coding unit of an encoding depth, at least one piece of information about the encoding mode may be determined for one largest coding unit. A depth of data of the largest coding unit may also vary according to locations since the data is hierarchically split according to encoding depths, and thus the encoding depth and the information about the encoding mode may be set for the data.

Accordingly, the output unit 820 according to the embodiment may assign encoding information about a corresponding encoding depth and an encoding mode to at least one of the coding unit, the prediction unit, and a minimum unit included in the largest coding unit.

The minimum unit according to an embodiment is a square data unit obtained by splitting the smallest coding unit constituting the lowermost encoding depth by 4. Alternatively, the minimum unit according to an embodiment may be a maximum square data unit that may be included in all of the coding units, prediction units, partition units, and transformation units included in the largest coding unit.

For example, the encoding information output by the output unit 820 may be classified into encoding information according to deeper coding units, and encoding information according to prediction units. The encoding information according to the deeper coding units may include the information about the prediction mode and about the size of the partitions. The encoding information according to the prediction units may include information about an estimated direction during an inter mode, about a reference image index of the inter mode, about a motion vector, about a chroma value of an intra mode, and about an interpolation method during the intra mode.

Information about a maximum size of the coding unit defined according to pictures, slice segments, or GOPs, and information about a maximum depth may be inserted into a header of a bitstream, a sequence parameter set, or a picture parameter set.

Information about a maximum size of the transformation unit allowed with respect to a current video, and information about a minimum size of the transformation unit may also be output through a header of a bitstream, a sequence parameter set, or a picture parameter set. The output unit 820 may encode and output reference information, prediction information, and slice segment type information, which are related to prediction.

According to the simplest embodiment for the video encoding apparatus 800, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. A current coding unit having a size of 2N×2N may also maximally include four lower-depth coding units having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Since encoding may be performed on each largest coding unit by using any one of various prediction modes and transformations, an optimal encoding mode may also be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The video encoding apparatus described above with reference to FIGS. 2A and 4A may include the video encoding apparatuses 800 corresponding to the number of views so as to encode texture images and depth images included in a plurality of views. For example, since three views are used in FIG. 7, three video encoding apparatuses 800 may be used to encode multi-view images of FIG. 7.

When the video encoding apparatuses 800 encode independent view images, the encoder 810 may determine a prediction unit for inter-image prediction according to each of coding units of a tree structure in each largest coding unit, and may perform the inter-image prediction on each prediction unit.

When the video encoding apparatuses 800 encode dependent view images, the encoder 810 may determine prediction units and coding units of a tree structure in each largest coding unit, and may perform inter-image prediction or inter-view prediction on each of the prediction units.

The video encoding apparatuses 800 may encode an inter-layer prediction error for predicting a current layer image by using an SAO. Thus, without having to encoding a prediction error according to sample locations, based on a sample value distribution of the prediction error, the prediction error of the current layer image may be encoded by using only an SAO type and information about an offset.

The encoder 810 according to an embodiment may perform functions of the binary map determiner 210 and the prediction value determiner 220 of FIG. 2A. According to embodiments, the encoder 810 may perform functions of the prediction value reference block determiner 410, the partition reference block determiner 420, the binary map determiner 430, and the prediction value determiner 440 of FIG. 4A.

Figure 8B:
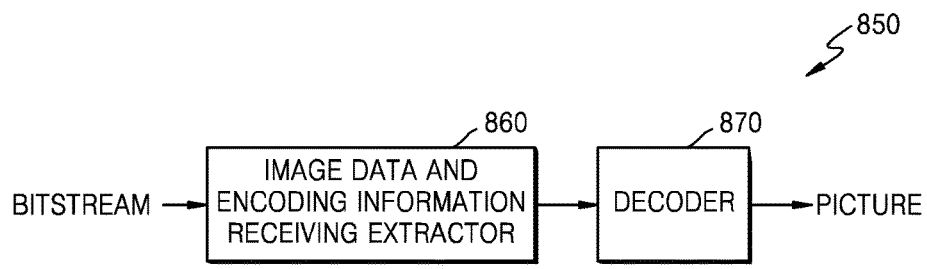
FIG. 8B is a block diagram of a video decoding apparatus based on coding units of a tree structure, according to an embodiment.

FIG. 8B illustrates a block diagram of a video decoding apparatus based on coding units of a tree structure 850, according to an embodiment.

The video decoding apparatus involving video prediction based on coding units of the tree structure 850 according to the embodiment includes an image data and encoding information receiving extractor 860 and a decoder 870. Hereinafter, for convenience of description, the video decoding apparatus involving video prediction based on coding units of the tree structure 850 according to the embodiment is referred to as the 'video decoding apparatus 850'.

Definitions of various terms, such as a coding unit, a depth, a prediction unit, a transformation unit, and various types of information about an encoding mode for decoding operations of the video decoding apparatus 850 according to the embodiment are identical to those described with reference to FIG. 8A and the video encoding apparatus 800.

The image data and encoding information receiving extractor 860 receives and parses a bitstream of an encoded video. The image data and encoding information receiving extractor 860 extracts encoded image data for each coding unit from the parsed bitstream, wherein the coding units have a tree structure according to each largest coding unit, and outputs the extracted image data to the decoder 870. The image data and encoding information receiving extractor 860 may extract information about a maximum size of a coding unit of a current picture, from a header about the current picture, a sequence parameter set, or a picture parameter set.

The image data and encoding information receiving extractor 860 also extracts, from the parsed bitstream, an encoding depth and information about the encoding mode having a tree structure according to each largest coding unit. The extracted encoding depth and the extracted information about the encoding mode are output to the decoder 870. That is, the image data in a bitstream is split into the largest coding unit so that the decoder 870 may decode the image data for each largest coding unit.

An encoding depth and information about the encoding mode according to each of the largest coding units may be set for one or more pieces of encoding depth information, and information about the encoding mode according to encoding depths may include partition type information of a corresponding coding unit, prediction mode information, and size information of a transformation unit. As the encoding depth information, the information about the encoding mode according to depths may also be extracted.

The encoding depth and the information about the encoding mode according to each of the largest coding units extracted by the image data and encoding information receiving extractor 860 are an encoding depth and information about the encoding mode determined to generate a minimum encoding error when an encoder, such as the video encoding apparatus 800, repeatedly performs encoding for each deeper coding unit according to depths according to each largest coding unit. Accordingly, the video decoding apparatus 850 may reconstruct an image by decoding data according to an encoding method that generates the minimum encoding error.

Since encoding information about the encoding depth and the encoding mode may be assigned to a predetermined data unit from among a corresponding coding unit, a prediction unit, and a minimum unit, the image data and encoding information receiving extractor 860 may extract the encoding depth and the information about the encoding mode according to the predetermined data units. If an encoding depth and information about the encoding mode of a corresponding largest coding unit are recorded according to each of the predetermined data units, predetermined data units having the same depth and the split information may be inferred to be the data units included in the same largest coding unit.

The decoder 870 reconstructs the current picture by decoding the image data in each largest coding unit based on the encoding depth and the information about the encoding mode according to each of the largest coding units. That is, the decoder 870 may decode the encoded image data, based on a read partition type, a prediction mode, and a transformation unit for each coding unit from among the coding units having the tree structure included in each largest coding unit. A decoding process may include a prediction process including intra prediction and motion compensation, and an inverse transformation process.

The decoder 870 may perform intra prediction or motion compensation according to a partition and a prediction mode of each coding unit, based on the information about the partition type and the prediction mode of the prediction unit of the coding unit according to encoding depths.

In addition, for inverse transformation for each largest coding unit, the decoder 870 may read information about a transformation unit according to a tree structure for each coding unit so as to perform inverse transformation based on transformation units for each coding unit. Due to the inverse transformation, a pixel value of a spatial domain of the coding unit may be reconstructed.

The decoder 870 may determine an encoding depth of a current largest coding unit by using split information according to depths. If the split information indicates that image data is no longer split in the current depth, the current depth is an encoding depth. Accordingly, the decoder 870 may decode the image data of the current largest coding unit by using the information about the partition type of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the decoder 870 in the same encoding mode. As such, the current coding unit may be decoded by obtaining the information about the encoding mode for each coding unit.

The video decoding apparatus described above with reference to FIGS. 1A and 3A may include the video decoding apparatuses 850 corresponding to the number of views, so as to decode texture images and depth images included in a plurality of views. For example, since three views are used in FIG. 7, the three video decoding apparatuses 850 may be used to decode the multi-view images of FIG. 7.

When an independent view image stream about an independent view image is received, the decoder 870 of the video decoding apparatus 850 may split samples of independent view images, which are extracted from the independent view image stream by the image data and encoding information receiving extractor 860, into coding units according to a tree structure of a largest coding unit. The decoder 870 may perform inter-image prediction on each of the coding units according to the tree structure of the samples of the reference layer images, and may reconstruct the independent view images.

When a dependent view mage stream is received, the decoder 870 of the video decoding apparatus 850 may split samples of the dependent view images, which are extracted from the dependent view image stream by the image data and encoding information receiving extractor 860, into coding units according to a tree structure of a largest coding unit. The decoder 870 may perform inter-image prediction or inter-view prediction on each of the coding units of the samples of the second layer images, and may reconstruct the dependent view images.

The image data and encoding information receiving extractor 860 may obtain an SAO type and an offset from the received current layer bitstream and determine an SAO category according to a distribution of sample values of each sample of a current layer prediction image, and thus obtaining offsets according to SAO categories by using the SAO type and the offset. Thus, although prediction errors according to samples are not received, the decoder 870 may compensate for an offset of a corresponding category for each sample of the current layer prediction image and determine a current layer reconstruction image with reference to the compensated current layer prediction image.

Thus, the video decoding apparatus 850 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed according to a size of a coding unit and an encoding mode that are adaptively determined according to characteristics of the image, by using optimal information about the encoding mode received from an encoding terminal.

The decoder 8710 according to embodiments may perform a function of the binary map determiner 110 and the prediction value determiner 120 of FIG. 1A. The decoder 8710 according to embodiments may perform functions of the prediction value reference block determiner 310, the partition reference block determiner 320, the binary map determiner 330, and the prediction value determiner 340 of FIG. 3A.

Figure 9:
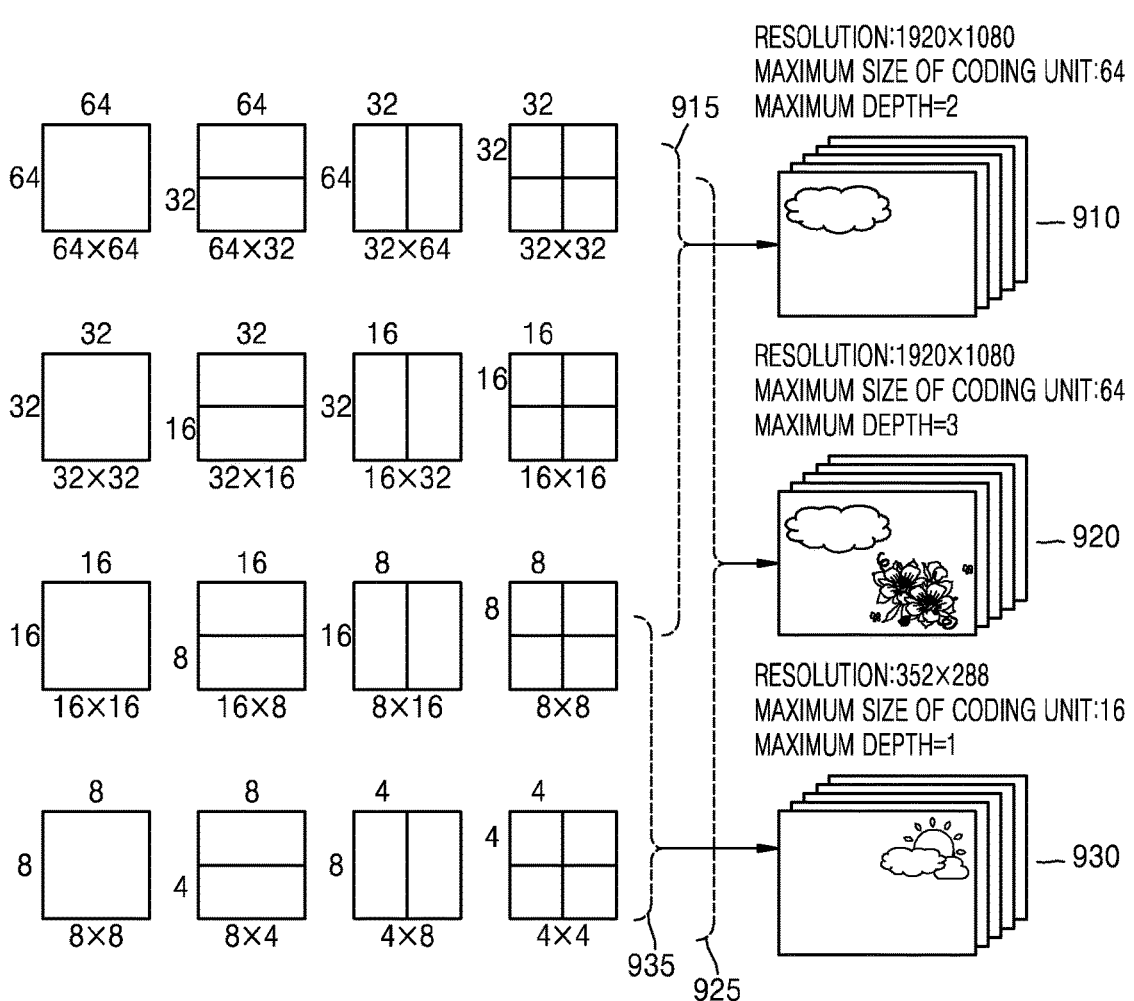
FIG. 9 illustrates a concept of coding units, according to an embodiment.

FIG. 9 illustrates a concept of coding units, according to an embodiment.

A size of a coding unit may be expressed by width x height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 910, a resolution is 1920×1080, a maximum size of a coding unit is 64, and a maximum depth is 2. In video data 920, a resolution is 1920×1080, a maximum size of a coding unit is 64, and a maximum depth is 3. In video data 930, a resolution is 352×288, a maximum size of a coding unit is 16, and a maximum depth is 1. The maximum depth shown in FIG. 9 denotes the total number of splits from a largest coding unit to a smallest coding unit.

If a resolution is high or a data amount is large, it is preferable that a maximum size of a coding unit is large so as to not only increase encoding efficiency but also to accurately reflect characteristics of an image. Accordingly, the maximum size of the coding unit of the video data 910 and 920 having a higher resolution than the video data 930 may be selected to 64.

Since the maximum depth of the video data 910 is 2, coding units 915 of the vide data 910 may include a largest coding unit having a long axis size of 64, and coding units having long axis sizes of 32 and 16 since depths are deepened to two layers by splitting the largest coding unit twice. On the other hand, since the maximum depth of the video data 930 is 1, coding units 935 of the video data 930 may include a largest coding unit having a long axis size of 16, and coding units having a long axis size of 8 since depths are deepened to one layer by splitting the largest coding unit once.

Since the maximum depth of the video data 920 is 3, coding units 925 of the video data 920 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 10A:
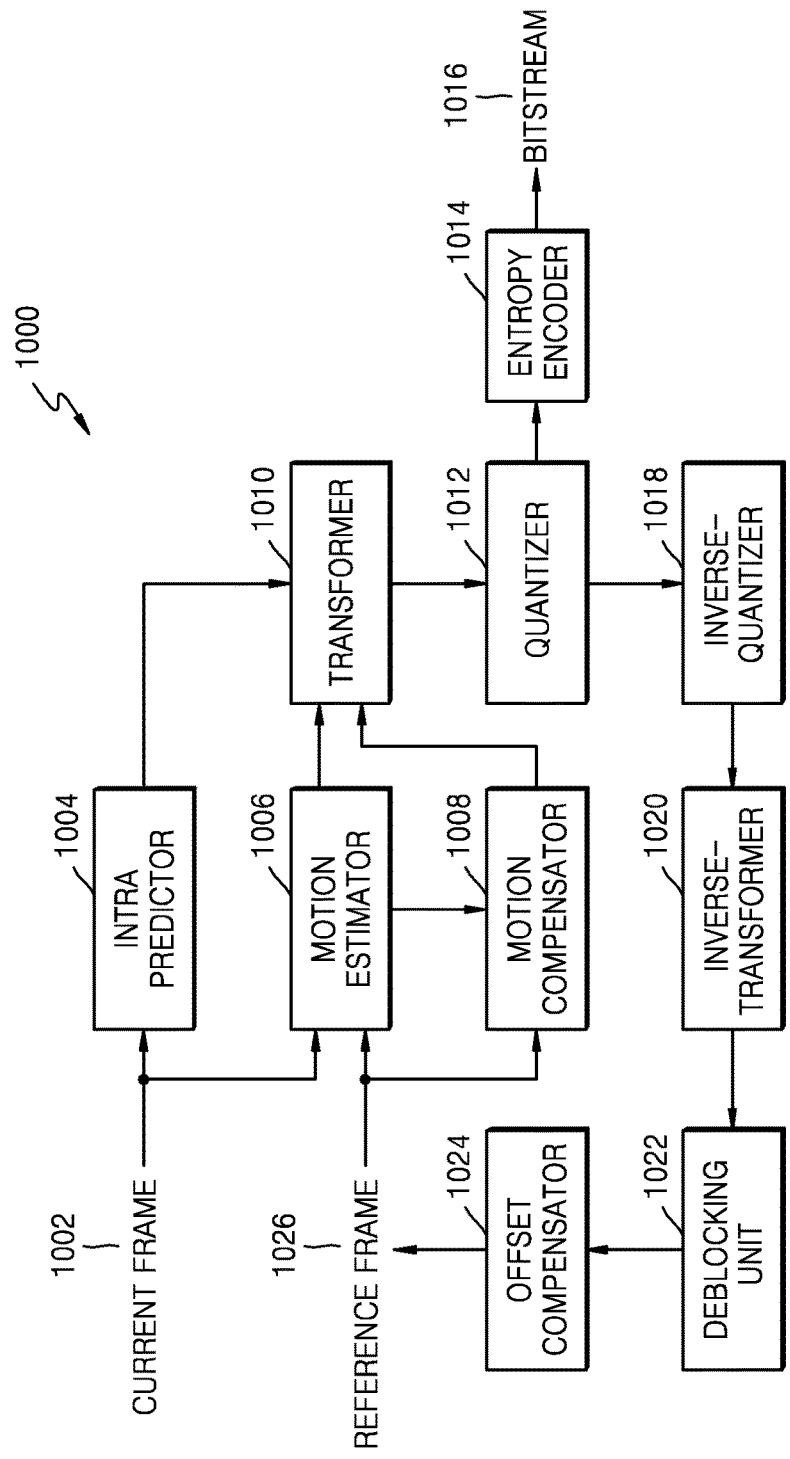
FIG. 10A is a block diagram of an image encoder based on coding units, according to an embodiment.

FIG. 10A is a block diagram of an image encoder 1000 based on coding units, according to an embodiment.

The image encoder 1000 according to an embodiment includes operations of an encoder 910 of the video encoding apparatus 900 so as to encode image data. That is, an intra predictor 1004 performs intra prediction on coding units in an intra mode, from among a current frame 1002, and a motion estimator 1006, and a motion compensator 1008 perform inter estimation and motion compensation by using the current frame 1002 of an inter mode and a reference frame 1026.

Data output from the intra predictor 1004, the motion estimator 1006, and the motion compensator 1008 is output as a quantized transformation coefficient through a data transformer 1010 and a quantizer 1012. The quantized transformation coefficient is reconstructed as data in a spatial domain through an inverse-quantizer 1018 and an inverse-transformer 1020. The reconstructed data in the spatial domain is post-processed through a deblocking unit 1022 and an offset compensator 1024 and is output as a reference frame 1026. The quantized transformation coefficient may be output as a bitstream 1016 through an entropy encoder 1014.

In order to be applied to the video encoding apparatus 900 according to an embodiment, all elements of the image encoder 1000, i.e., the intra predictor 1004, the motion estimator 1006, the motion compensator 1008, the transformer 1010, the quantizer 1012, the entropy encoder 1014, the inverse-quantizer 1018, the inverse-transformer 1020, the deblocking unit 1022, and the offset compensator 1024, has to perform operations based on each coding unit among coding units having a tree structure according to each largest coding unit in consideration of a maximum depth.

In particular, the intra predictor 1004, the motion estimator 1006, and the motion compensator 1008 may determine a partition and a prediction mode of each coding unit from among the coding units having a tree structure, by taking into account the maximum size and the maximum depth of a current largest coding unit, and the transformer 1010 has to determine a size of a transformation unit in each coding unit from among the coding units having a tree structure.

Figure 10B:
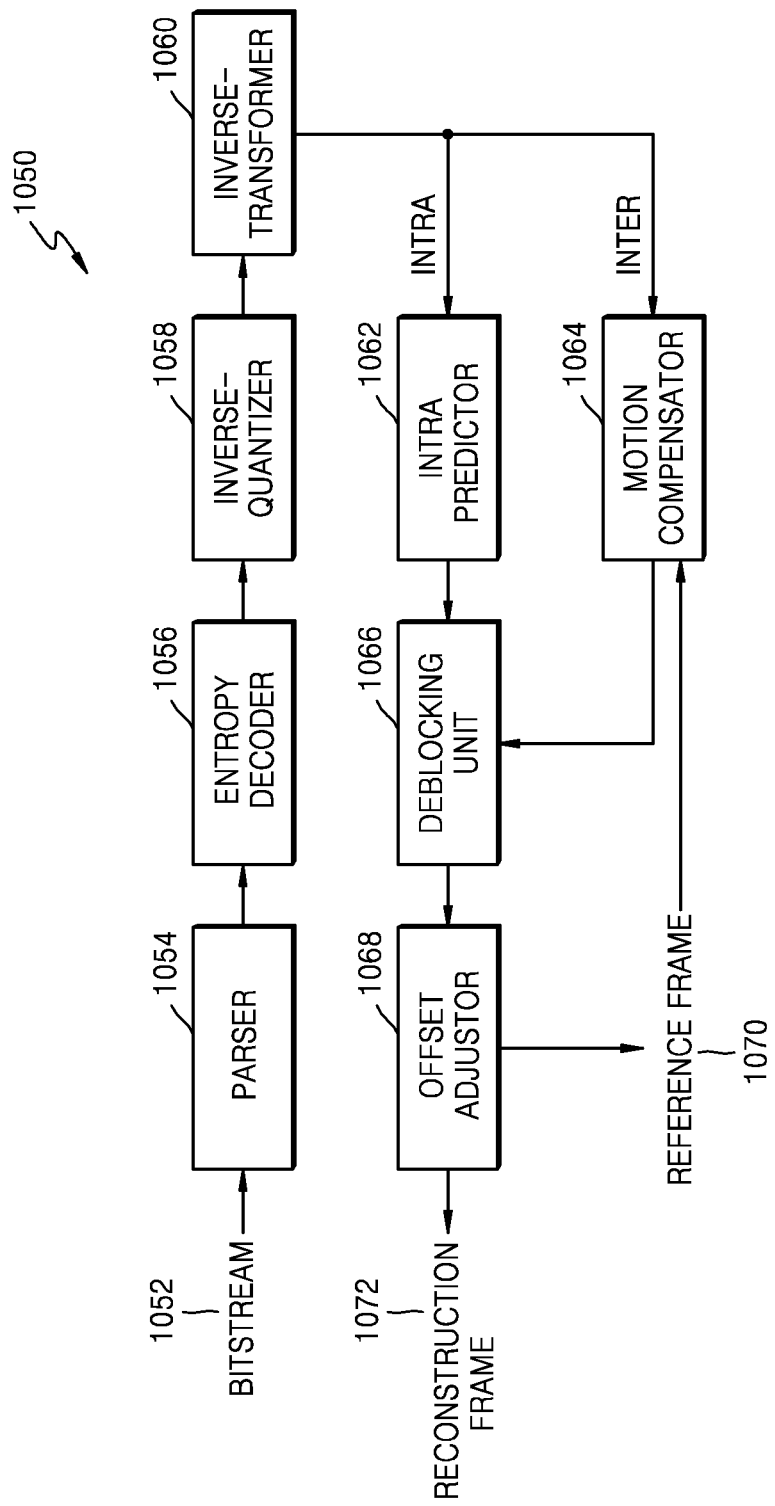
FIG. 10B is a block diagram of an image decoder based on coding units, according to an embodiment.

FIG. 10B is a block diagram of an image decoder 1050 based on coding units, according to an embodiment.

A bitstream 1052 is parsed as encoded image data to be decoded and information about encoding required for decoding through a parser 1054. The encoded image data is output as inverse-quantized data through an entropy encoder 1056 and an inverse-quantizer 1058. Image data in a spatial domain is reconstructed through an inverse-transformer 1060.

For the image data in the spatial domain, an intra predictor 1062 performs intra prediction on coding units of an intra mode. A motion compensator 1064 performs motion compensation on coding units of an inter mode by using a reference frame 1070.

The data in the spatial domain through the intra predictor 1062 and the motion compensator 1064 may be post-processed through a deblocking unit 1066 and an offset adjustor 1068 and may be output as a reconstruction frame 1072. Also, the data post-processed through the deblocking unit 1066 and a loop filtering unit 1068 may be output as a reference frame 1070.

In order for a decoder 970 of the video decoding apparatus 1050 to decode the image data, operations after the parser 1054 of the image encoder 1050 according to an embodiment may be performed.

In order to be applied to the video decoding apparatus 950 according to an embodiment, all elements of the image encoder 1050, i.e., the parser 1054, the entropy decoder 1056, the inverse-quantizer 1058, the inverse-transformer 1060, the intra predictor 1062, the motion compensator 1064, the deblocking unit 1066, and the offset adjustor 1068 has to perform operations based on coding units having a tree structure for each largest coding unit.

In particular, the intra predictor 1062 and the motion compensator 1064 may determine a partition and a prediction mode of each of the coding units according to a tree structure, and the inverse-transformer 1060 has to determine a size of a transformation unit in each coding unit.

The encoding operation of FIG. 10A and the decoding operation of FIG. 10B are described as a videostream encoding operation and a videostream decoding operation, respectively, in a single layer. Thus, if the scalable video encoding apparatus 1200 of FIG. 12A encodes a videostream of two or more layers, the image encoder 1000 may be provided for each layer. Similarly, if the scalable video decoding apparatus 1250 of FIG. 12B decodes a videostream of two or more layers, the image encoder 1050 may be provided for each layer.

Figure 11:
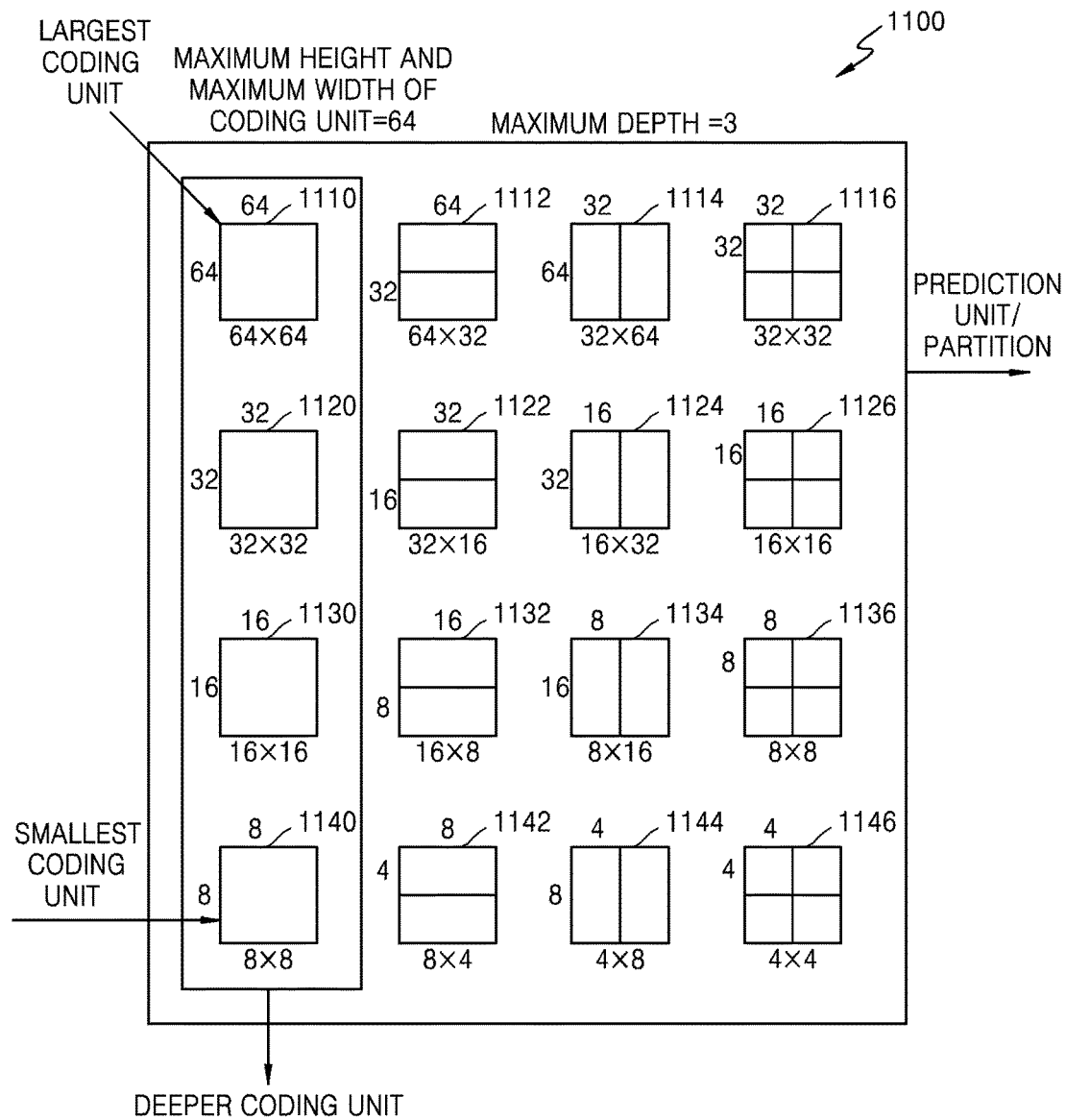
FIG. 11 illustrates deeper coding units according to depths, and partitions, according to an embodiment.

FIG. 11 illustrates deeper coding units according to depths, and partitions, according to an embodiment.

The video encoding apparatus 800 according to an embodiment and the video decoding apparatus 850 according to an embodiment use hierarchical coding units so as to consider characteristics of an image. A maximum height, a maximum width, and a maximum depth of coding units may be adaptively determined according to the characteristics of the image, or may be variously set according to user requests. Sizes of deeper coding units according to depths may be determined according to the predetermined maximum size of the coding unit.

In a hierarchical structure of coding units 1100 according to an embodiment, the maximum height and the maximum width of the coding units are each 64, and the maximum depth is 3. In this case, the maximum depth represents a total number of times the coding unit is split from the largest coding unit to the smallest coding unit. Since a depth deepens along a vertical axis of the hierarchical structure of coding units 1100, a height and a width of the deeper coding unit are each split. A prediction unit and partitions, which are bases for prediction encoding of each deeper coding unit, are also shown along a horizontal axis of the hierarchical structure of coding units 1100.

That is, a coding unit 1110 is a largest coding unit in the hierarchical structure of coding units 1100, wherein a depth is 0 and a size, i.e., a height by width, is 64×64. The depth deepens along the vertical axis, and a coding unit 1120 having a size of 32×32 and a depth of 1, a coding unit 1130 having a size of 16×16 and a depth of 2, and a coding unit 1140 having a size of 8×8 and a depth of 3. The coding unit 1140 having the size of 8×8 and the depth of 3 is a smallest coding unit.

The prediction unit and the partitions of a coding unit are arranged along the horizontal axis according to each depth. That is, if the coding unit 1110 having a size of 64×64 and a depth of 0 is a prediction unit, the prediction unit may be split into partitions include in the coding unit 1110 having the size of 64×64, i.e. a partition 1110 having a size of 64×64, partitions 1112 having the size of 64×32, partitions 1114 having the size of 32×64, or partitions 1116 having the size of 32×32.

Equally, a prediction unit of the coding unit 1120 having the size of 32×32 and the depth of 1 may be split into partitions included in the coding unit 1120 having the size of 32×32, i.e. a partition 1120 having a size of 32×32, partitions 1122 having a size of 32×16, partitions 1124 having a size of 16×32, and partitions 1126 having a size of 16×16.

Equally, a prediction unit of the coding unit 1130 having the size of 16×16 and the depth of 2 may be split into partitions included in the coding unit 1130 having the size of 16×16, i.e. a partition 1130 having a size of 16×16 included in the coding unit 1130, partitions 1132 having a size of 16×8, partitions 1134 having a size of 8×16, and partitions 1136 having a size of 8×8.

Equally, a prediction unit of the coding unit 1140 having the size of 8×8 and the depth of 3 may be split into partitions included in the coding unit 1140 having the size of 8×8, i.e. a partition 1140 having a size of 8×8 included in the coding unit 1140, partitions 1142 having a size of 8×4, partitions 1144 having a size of 4×8, and partitions 1146 having a size of 4×4.

In order to determine a depth of the largest coding unit 1110, the encoder 820 of the video encoding apparatus 100 according to an embodiment has to perform encoding on coding units respectively corresponding to depths included in the largest coding unit 1110.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare results of encoding the same data according to depths, the data has to be encoded by using each of the coding unit corresponding to the depth of 1 and four coding units corresponding to the depth of 2.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 1100. The minimum encoding error may also be searched for by comparing representative encoding errors according to depths, by performing encoding for each depth as the depth deepens along the vertical axis of the hierarchical structure of coding units 1100. A depth and a partition generating the minimum encoding error in the largest coding unit 1110 may be selected as an encoding depth and a partition type of the largest coding unit 1110.

Figure 12:
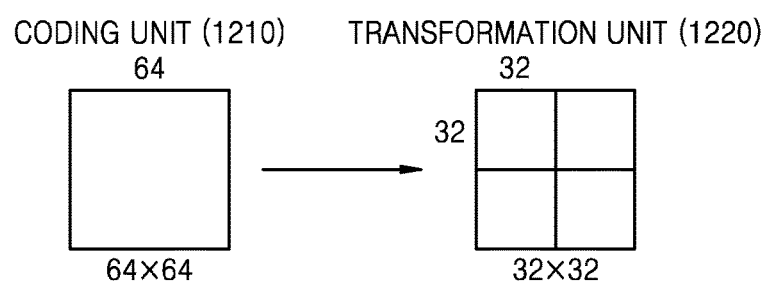
FIG. 12 illustrates a relationship between a coding unit and transformation units, according to an embodiment.

FIG. 12 illustrates a relationship between a coding unit and transformation units, according to an embodiment.

The video encoding apparatus 800 according to an embodiment or the video decoding apparatus 850 according to an embodiment encodes or decodes an image according to coding units having sizes smaller than or equal to a largest coding unit for each largest coding unit. Sizes of transformation units for transformation during an encoding process may be selected based on data units that are not larger than a corresponding coding unit.

For example, in the video encoding apparatus 800 or the video decoding apparatus 850, when a size of the coding unit 1210 is 64×64, transformation may be performed by using the transformation units 1220 having a size of 32×32.

Data of the coding unit 1210 having the size of 64×64 may also be encoded by performing the transformation on each of the transformation units having the size of 32×32, 16×16, 8×8, and 4×4, which are smaller than 64×64, and then a transformation unit having the least coding error with respect to an original image may be selected.

Figure 13:
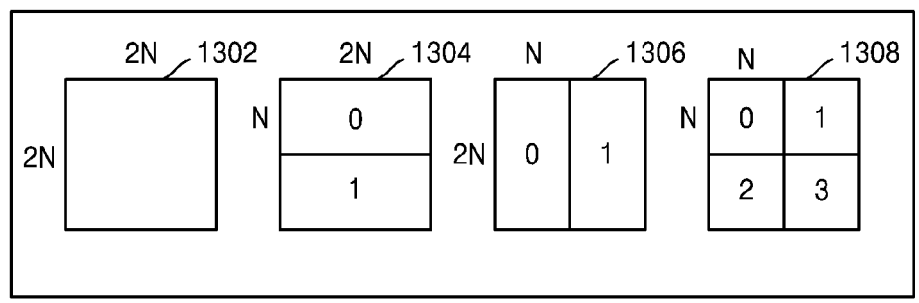
FIG. 13 illustrates a plurality of pieces of encoding information according to depths, according to an embodiment.
Figure 13:
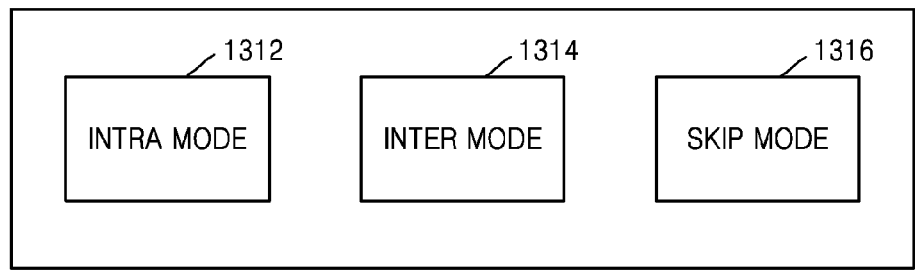
Figure 13:
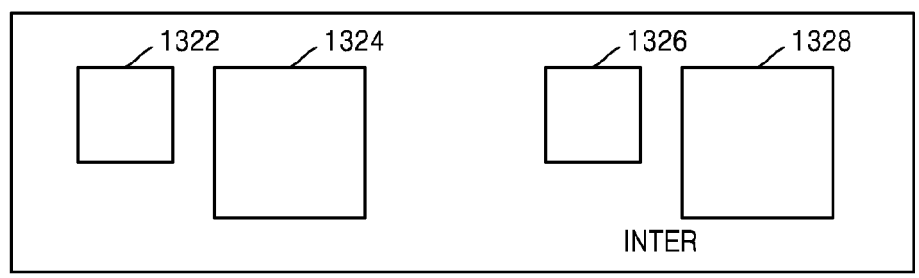

FIG. 13 illustrates a plurality of pieces of encoding information according to depths, according to an embodiment.

The output unit 820 of the video encoding apparatus 100 according to an embodiment may encode and transmit, as information about an encoding mode, partition type information 1300, prediction mode information 1310, and transformation unit size information 1320 for each coding unit corresponding to an encoding depth.

The partition type information 1300 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1302 having a size of 2N×2N, a partition 1304 having a size of 2N×N, a partition 1306 having a size of N×2N, and a partition 1308 having a size of N×N. In this case, the partition type information 1300 about a current coding unit is set to indicate one of the partition 1302 having a size of 2N×2N, the partition 1304 having a size of 2N×N, the partition 1306 having a size of N×2N, and the partition 1308 having a size of N×N.

The prediction mode information 1310 indicates a prediction mode of each partition. For example, the prediction mode information 1310 may indicate a mode of prediction encoding performed on a partition indicated by the partition type information 1300, i.e., an intra mode 1312, an inter mode 1314, or a skip mode 1316.

The transformation unit size information 1320 represents a transformation unit to be based on when transformation is performed on a current coding unit. For example, the transformation unit may be one of a first intra transformation unit 1322, a second intra transformation unit 1324, a first inter transformation unit 1326, and a second inter transformation unit 1328.

The image data and encoding information receiving extractor 860 of the video decoding apparatus 850 may extract and use the partition type information 1300, the prediction mode information 1310, and the transformation unit size information 1320 for decoding, according to each deeper coding unit.

Figure 14:
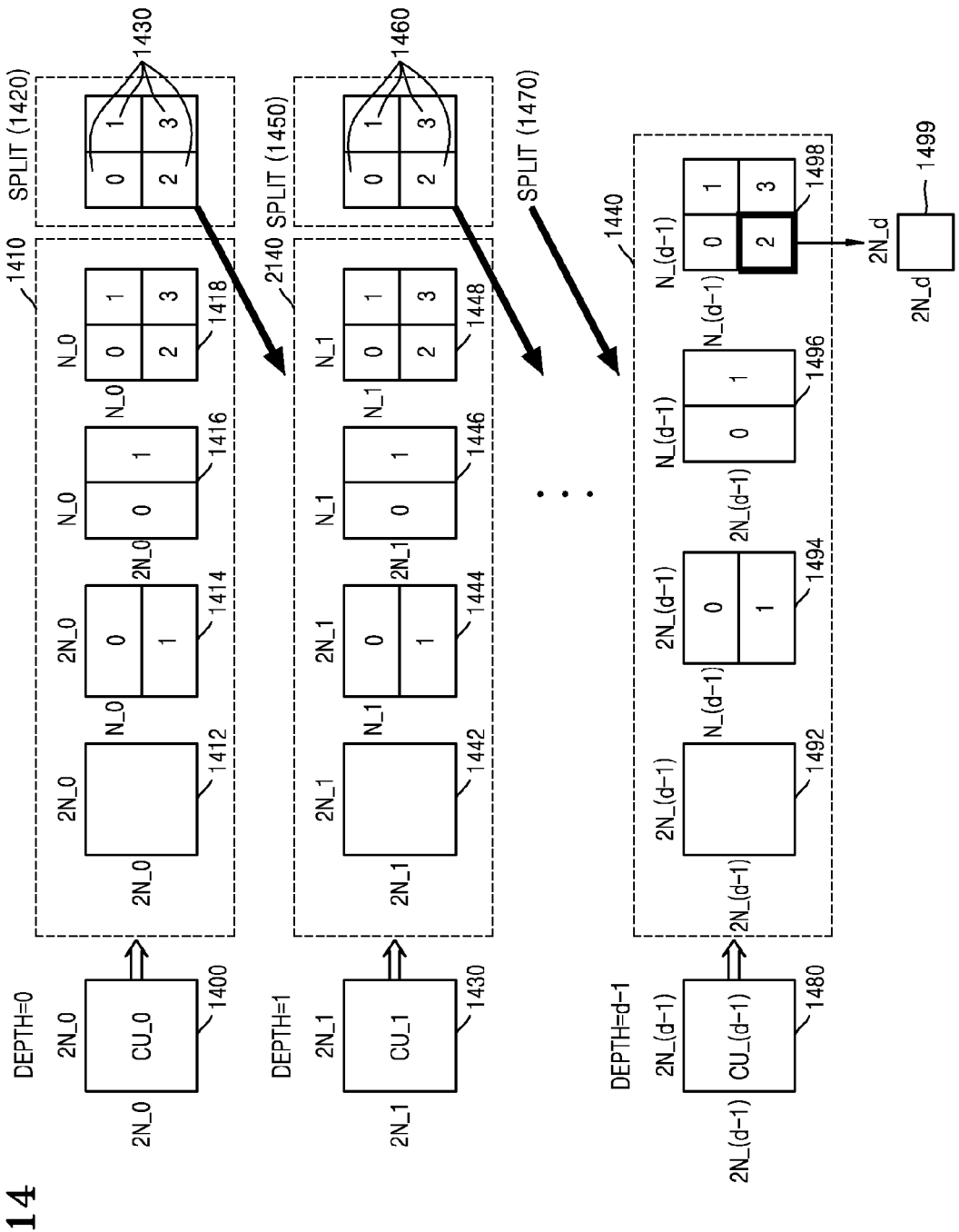
FIG. 14 illustrates deeper coding units according to depths, according to an embodiment.

FIG. 14 illustrates deeper coding units according to depths, according to an embodiment.

Split information may be used to represent a change in a depth. The spilt information specifies whether a coding unit of a current depth is split into coding units of a lower depth.

A prediction unit 1610 for prediction encoding a coding unit 1400 having a depth of 0 and a size of $2N\_0 \times 2N\_0$ may include partitions of a partition type 1412 having a size of $2N\_0 \times 2N\_0$, a partition type 1414 having a size of $2N\_0 \times N\_0$, a partition type 1416 having a size of $N\_0 \times 2N\_0$, and a partition type 1418 having a size of $N\_0 \times N\_0$. Only the partition types 1412, 1414, 1416, and 1418 which are obtained by symmetrically splitting the prediction unit are illustrated, but as described above, a partition type is not limited thereto and may include asymmetrical partitions, partitions having a predetermined shape, and partitions having a geometrical shape.

According to each partition type, prediction encoding has to be repeatedly performed on one partition having a size of $2N\_0 \times 2N\_0$, two partitions having a size of $2N\_0 \times N\_0$, two partitions having a size of $N\_0 \times 2N\_0$, and four partitions having a size of $N\_0 \times N\_0$. The prediction encoding in an intra mode and an inter mode may be performed on the partitions having the sizes of $2N\_0 \times 2N\_0$, $N\_0 \times 2N\_0$, $2N\_0 \times N\_0$, and $N\_0 \times N\_0$. The prediction encoding in a skip mode may be performed only on the partition having the size of $2N\_0 \times 2N\_0$.

If an encoding error is smallest in one of the partition types 1412, 1414, and 1416 having the sizes of $2N\_0 \times 2N\_0$, $2N\_0 \times N\_0$ and $N\_0 \times 2N\_0$, the prediction unit 1610 may not be split into a lower depth.

If the encoding error is the smallest in the partition type 1418 having the size of $N\_0 \times N\_0$, a depth is changed from 0 to 1 and split is performed (operation 1620), and encoding may be repeatedly performed on coding units 1430 of a partition type having a depth of 2 and a size of $N\_0 \times N\_0$ so as to search for a minimum encoding error.

A prediction unit 1630 for prediction encoding the coding unit 1430 having a depth of 1 and a size of $2N\_1 \times 2N\_1$ ($=N\_0 \times N\_0$) may include a partition type 1442 having a size of $2N\_1 \times 2N\_1$, a partition type 1444 having a size of $2N\_1 \times N\_1$, a partition type 1446 having a size of $N\_1 \times 2N\_1$, and a partition type 1448 having a size of $N\_1 \times N\_1$.

If an encoding error is the smallest in the partition type 1448 having the size of $N\_1 \times N\_1$, a depth is changed from 1 to 2 and split is performed (in operation 1450), and encoding is repeatedly performed on coding units 1460 having a depth of 2 and a size of $N\_2 \times N\_2$ so as to search for a minimum encoding error.

When a maximum depth is d, deeper coding units according to depths may be set until when a depth corresponds to d−1, and split information may be set until when a depth corresponds to d−2. That is, when encoding is performed up to when the depth is d−1 after a coding unit corresponding to a depth of d−2 is split (in operation 1470), a prediction unit 1490 for prediction encoding a coding unit 1480 having a depth of d−1 and a size of $2N\_(d-1) \times 2N\_(d-1)$ may include partitions of a partition type 1492 having a size of $2N\_(d-1) \times 2N\_(d-1)$, a partition type 1494 having a size of $2N\_(d-1) \times N\_(d-1)$, a partition type 1496 having a size of $N\_(d-1) \times 2N\_(d-1)$, and a partition type 1498 having a size of $N\_(d-1) \times N\_(d-1)$.

Prediction encoding may be repeatedly performed on one partition having a size of $2N\_(d-1) \times 2N\_(d-1)$, two partitions having a size of $2N\_(d-1) \times N\_(d-1)$, two partitions having a size of $N\_(d-1) \times 2N\_(d-1)$, four partitions having a size of $N\_(d-1) \times N\_(d-1)$ from among the partition types so as to search for a partition type generating a minimum encoding error.

Even when the partition type 1498 having the size of $N\_(d-1) \times N\_(d-1)$ has the minimum encoding error, since a maximum depth is d, a coding unit CU\_(d−1) having a depth of d−1 is no longer split into a lower depth, and a depth for the coding units constituting a current largest coding unit 1400 is determined to be d−1 and a partition type of the current largest coding unit 1400 may be determined to be $N\_(d-1) \times N\_(d-1)$. Since the maximum depth is d, split information for a coding unit 1452 corresponding to a depth of d−1 is not also set.

A data unit 1499 may be a 'minimum unit' for the current largest coding unit. A minimum unit according to the embodiment may be a square data unit obtained by splitting a smallest coding unit having a lowermost encoding depth by 4. By performing the encoding repeatedly, the video encoding apparatus 100 according to the embodiment may select an encoding depth having the least encoding error by comparing encoding errors according to depths of the coding unit 1400 to determine a depth, and set a corresponding partition type and a prediction mode as an encoding mode of the encoding depth.

As such, the minimum encoding errors according to depths are compared in all of the depths of 0, 1, . . . , d−1, d, and a depth having the least encoding error may be determined as an encoding depth. The encoding depth, the partition type of the prediction unit, and the prediction mode may be encoded and transmitted as information about the encoding mode. Since a coding unit has to be split from a depth of 0 to an encoding depth, only split information of the encoding depth is also set to '0', and split information of depths excluding the encoding depth is also set to '1'.

The image data and encoding information receiving extractor 860 of the video decoding apparatus 850 according to the embodiment may extract and use an encoding depth and prediction unit information about the coding unit 1400 so as to decode the coding unit 1412. The video decoding apparatus 850 according to the embodiment may determine a depth, in which split information is '0', as an encoding depth by using split information according to depths, and may use, for decoding, information about the encoding mode with respect to the corresponding depth.

Figure 15:
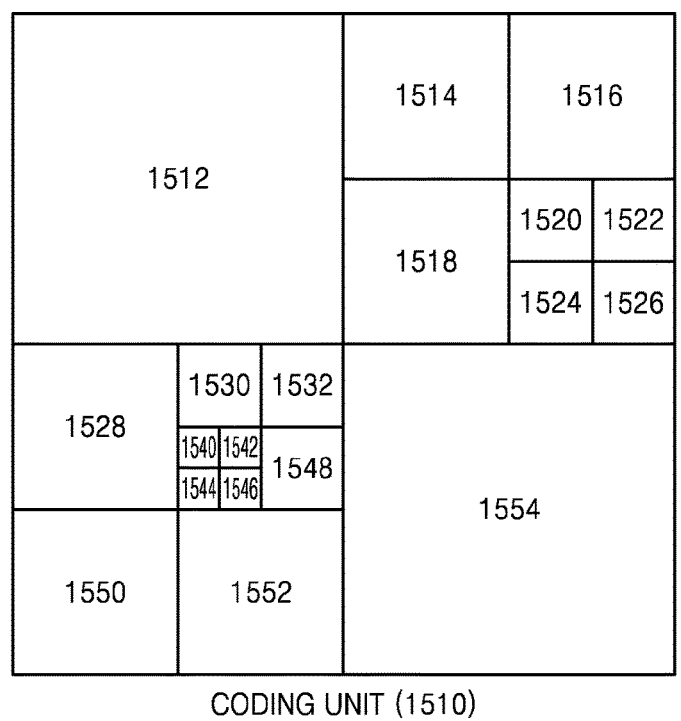
FIGS. 15, 16, and 17 illustrate a relationship between coding units, prediction units, and transformation units, according to an embodiment.
Figure 16:
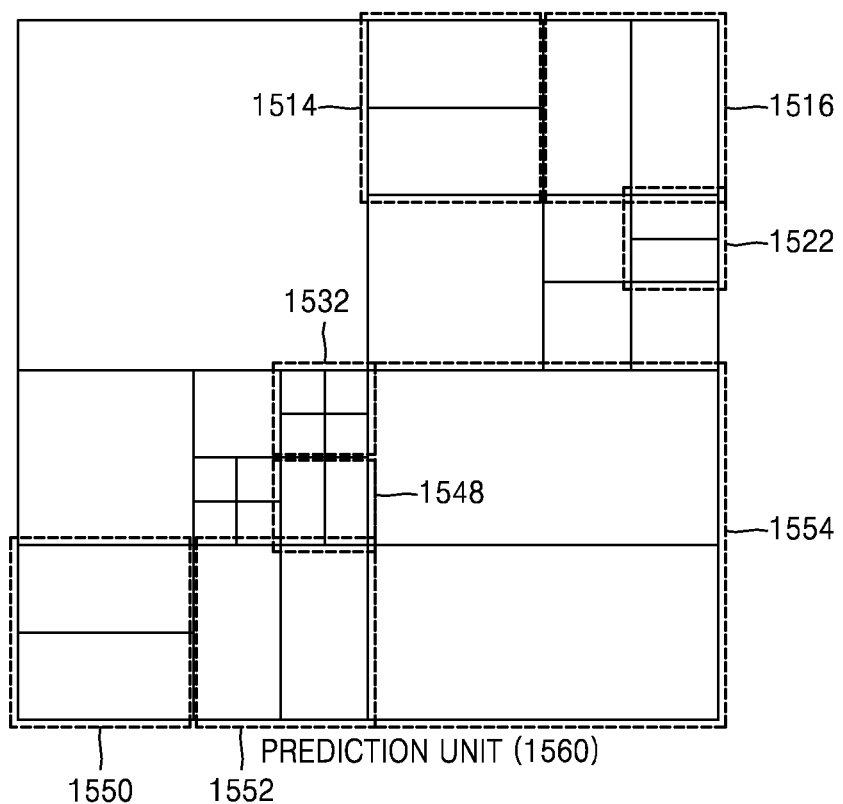
Figure 17:
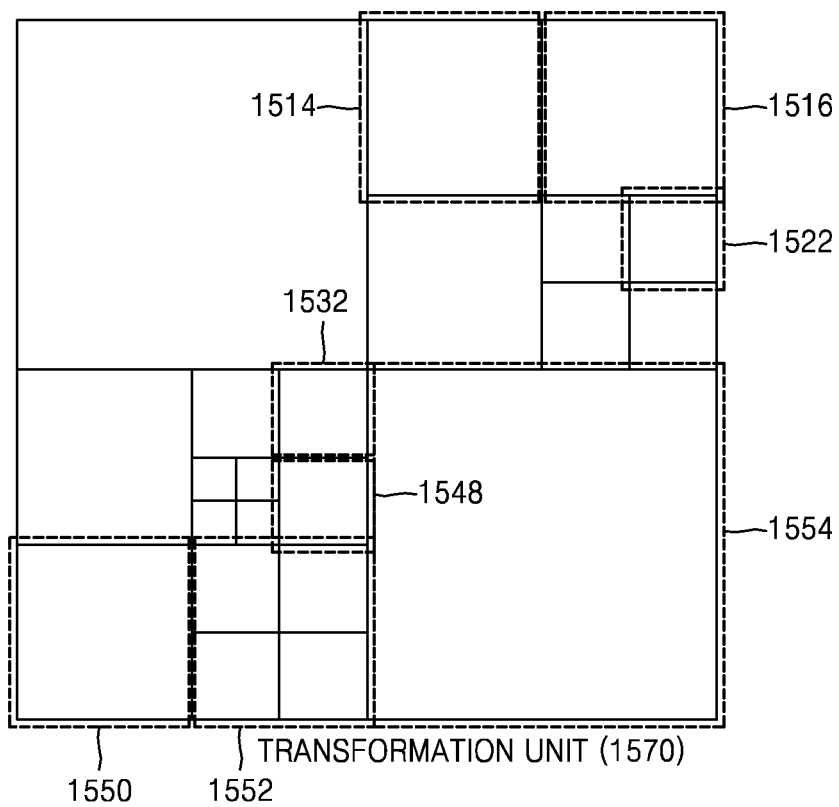

FIGS. 15, 16, and 17 illustrate a relationship between coding units, prediction units, and transformation units, according to an embodiment.

Coding units 1510 are deeper coding units according to encoding depths determined by the video encoding apparatus 800, in a largest coding unit. Prediction units 1560 are partitions of prediction units of each of the coding units 1510 according to encoding depths, and transformation units 1570 are transformation units of each of the coding units according to encoding depths.

When a depth of a largest coding unit is 0 in the deeper coding units 1510, depths of coding units 1512 are 1, depths of coding units 1514, 1516, 1518, 1528, 1550, and 1552 are 2, depths of coding units 1520, 1522, 1524, 1526, 1530, 1532, and 1548 are 3, and depths of coding units 1540, 1542, 1544, and 1546 are 4.

Some partitions 1514, 1516, 1522, 1532, 1548, 1550, 1552, and 1554 from among the prediction units 1560 are obtained by splitting the coding unit. That is, partitions 1514, 1522, 1550, and 1554 are a partition type having a size of 2N×N, partitions 1516, 1548, and 1552 are a partition type having a size of N×2N, and a partition 1532 is a partition type having a size of N×N. Prediction units and partitions of the deeper coding units 1510 are smaller than or equal to each coding unit.

Transformation or inverse transformation is performed on image data of the coding unit 1552 in the transformation units 1570 in a data unit that is smaller than the coding unit 1552. The coding units 1514, 1516, 1522, 1532, 1548, 1550, 1552, and 1554 in the transformation units 1560 are also data units different from those in the prediction units 1560 in terms of sizes or shapes. That is, the video encoding apparatus 800 and the video decoding apparatus 850 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit so as to determine an optimum coding unit, and thus coding units according to a recursive tree structure may be obtained. Encoding information may include split information about a coding unit, partition type information, prediction mode information, and transformation unit size information. Table 1 below shows the encoding information that may be set by the video encoding apparatus 800 and the video decoding apparatus 850 according to the embodiments.

The output unit 820 of the video encoding apparatus 100 according to the embodiment may output the encoding information about the coding units having a tree structure, and the image data and encoding information receiving extractor 860 of the video decoding apparatus 850 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is an encoding depth, and thus partition type information, prediction mode information, and transformation unit size information may be defined for the encoding depth. If the current coding unit has to be further split according to the split information, encoding has to be independently performed on each of four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The partition type information may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. If a partition type of the current coding unit having the size of 2N×2N is a symmetrical partition type, a size of a transformation unit may also be N×N. If the partition type of the current coding unit is an asymmetrical partition type, the size of the transformation unit may also be N/2×N/2.

The encoding information about coding units having a tree structure according to an embodiment may be assigned to at least one of a coding unit corresponding to an encoding

TABLE 1

| Split Information 0 (Encoding on Coding Unit having Size of 2N × 2N and Current Depth of d) | | | | Split Information 1 |
|---|---|---|---|---|
| Prediction Mode | Partition Type | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit |
| | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | depth, a prediction unit, and a minimum unit. The coding unit corresponding to the encoding depth may include one or more prediction units and minimum units containing the same encoding information.

Accordingly, it may be determined whether adjacent data units are included in the same coding unit corresponding to the coded encoding depth by comparing encoding information of the adjacent data units. A coding unit corresponding to the coded encoding depth is also determined by using encoding information of a data unit, and thus a distribution of encoding depths in a largest coding unit may be inferred.

Accordingly, in this case, if prediction of a current coding unit is performed based on adjacent data units, encoding information of data units in deeper coding units adjacent to the current coding unit may be directly referred to and used.

In another embodiment, if prediction of the current coding unit is performed encoded based on adjacent coding units, data adjacent to the current coding unit may be searched within deeper coding units by using encoded information of adjacent deeper coding units, and thus the adjacent coding units may be referred.

Figure 18:
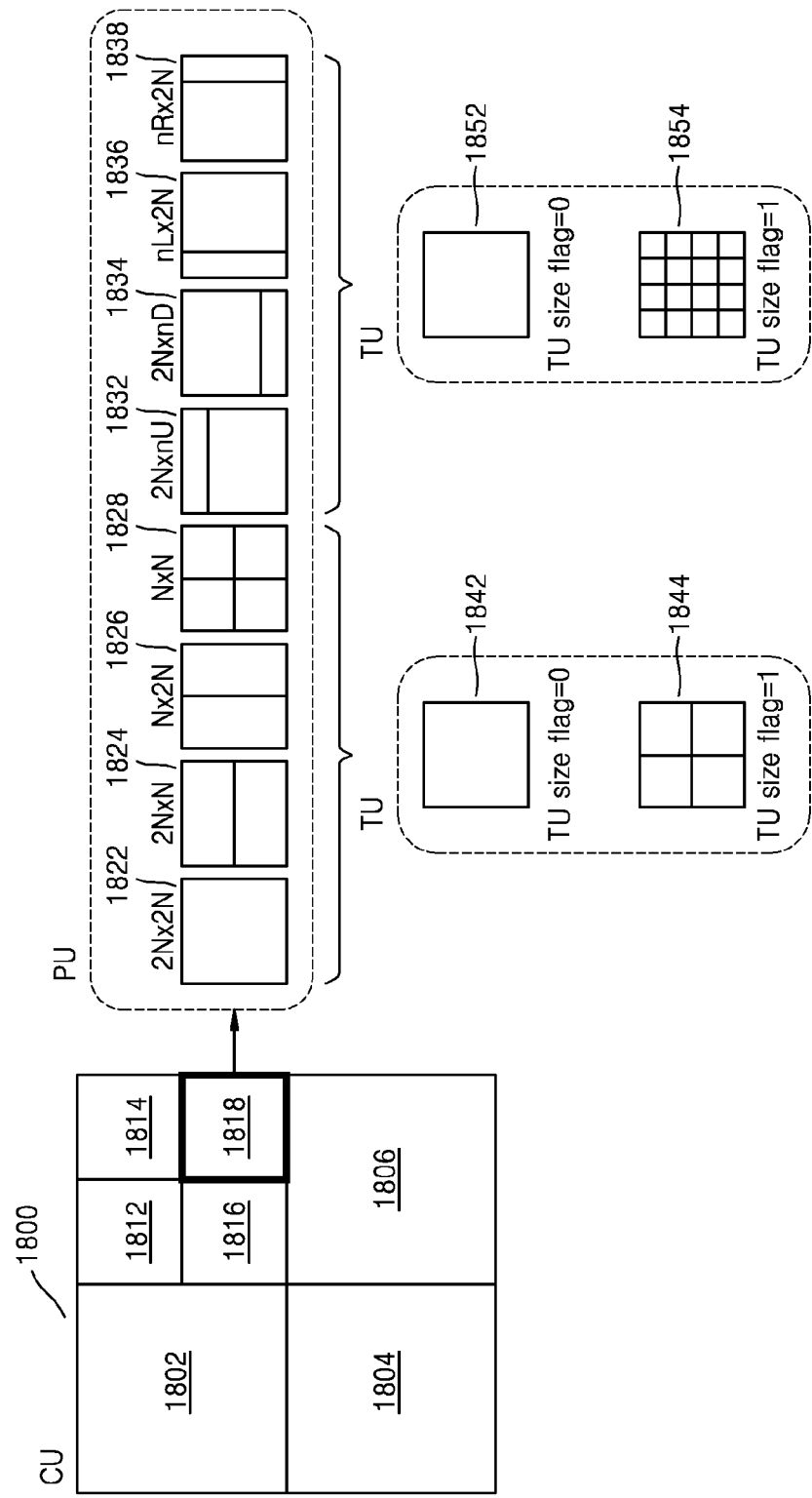
FIG. 18 illustrates a relationship between a coding unit, a prediction unit, and a transformation unit, according to encoding mode information of Table 1.

FIG. 18 illustrates a relationship between a coding unit, a prediction unit, and a transformation unit, according to encoding mode information of Table 1.

A largest coding unit 1800 includes coding units 1802, 1804, 1806, 1812, 1814, 1816, and 1818 of encoding depths. Here, since the coding unit 1818 is a coding unit of an encoding depth, split information may be set to 0. Partition type information of the coding unit 1818 having a size of 2N×2N may be set to be one of partition types including 2N×2N 1822, 2N×N 1824, N×2N 1826, N×N 1828, 2N×nU 1832, 2N×nD 1834, nL×2N 1836, and nR×2N 1838.

Transformation unit split information (TU size flag) is a type of a transformation index, and a size of a transformation unit corresponding to the transformation index may be changed according to a prediction unit type or partition type of the coding unit.

For example, when the partition type information is set to be one of symmetrical partition types 2N×2N 1822, 2N×N 1824, N×2N 1826, and N×N 1828, if the transformation unit split information is 0, a transformation unit 1842 having a size of 2N×2N is set, and if the transformation unit split information is 1, a transformation unit 1844 having a size of N×N may be set.

When the partition type information is set to be one of asymmetrical partition types 2N×nU 1832, 2N×nD 1834, nL×2N 1836, and nR×2N 1838, if the transformation unit split information (TU size flag) is 0, a transformation unit 1852 having a size of 2N×2N may be set, and if the transformation unit split information is 1, a transformation unit 1854 having a size of N/2×N/2 may be set.

The transformation unit split information (TU size flag) described above with reference to FIG. 12 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 850 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be smaller than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize}=\max(\text{MinTransformSize},\text{RootTuSize}/(2^{\wedge}\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize},\text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize}=\min(\text{MaxTransformSize},\text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 15 through 18, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The embodiments of the present invention may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

For convenience of description, the scalable video encoding methods and/or the video encoding method, which are described with reference to FIGS. 6A through 18, will be collectively referred to as 'the video encoding method of the present invention'. The scalable video decoding methods and/or the video decoding method, which are described with reference to FIGS. 6A through 18, will also be collectively referred to as 'the video decoding method of the present invention'.

A video encoding apparatus including the scalable video decoding apparatus 1200, the video encoding apparatus 800 or the image encoder 1000 which are described with reference to FIGS. 6A through 18 will also be collectively referred to as a 'video encoding apparatus of the present invention'. A video decoding apparatus including the scalable video decoding apparatus 1250, the video decoding apparatus 850, or the image encoder 1050 which are described with reference to FIGS. 6A through 18 will also be collectively referred to as a 'video decoding apparatus of the present invention'.

A computer-readable recording medium storing a program, e.g., a disc 26000, according to an embodiment will now be described in detail.

Figure 19:
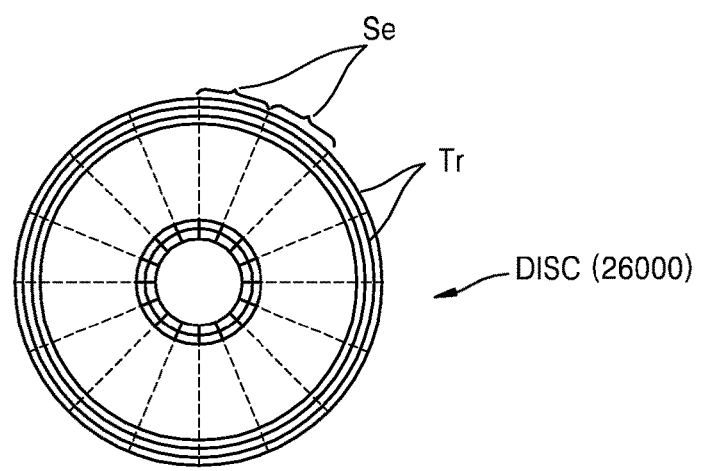
FIG. 19 illustrates a physical structure of a disc in which a program is stored, according to an embodiment.

FIG. 19 illustrates a physical structure of the disc 26000 in which a program is stored, according to an embodiment. The disc 26000, as a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 21.

Figure 20:
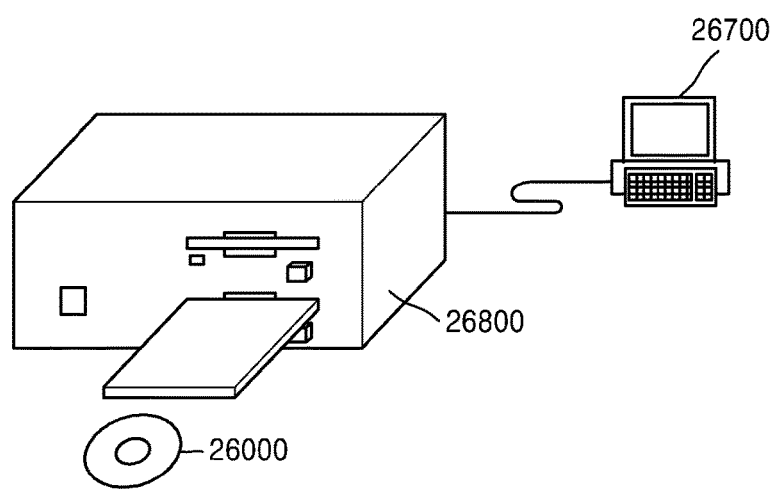
FIG. 20 illustrates a disc drive for recording and reading a program by using the disc.

FIG. 20 illustrates a disc drive 26800 for recording and reading a program by using the disc 26000. A computer system 26700 may store a program that executes at least one of the video encoding method and the video decoding method of the present invention, in the disc 26000 via the disc drive 26800. In order to run the program stored in the disc 26000 in the computer system 26700, the program may be read from the disc 26000 and may be transmitted to the computer system 26700 by using the disc drive 26800.

Figure 21:
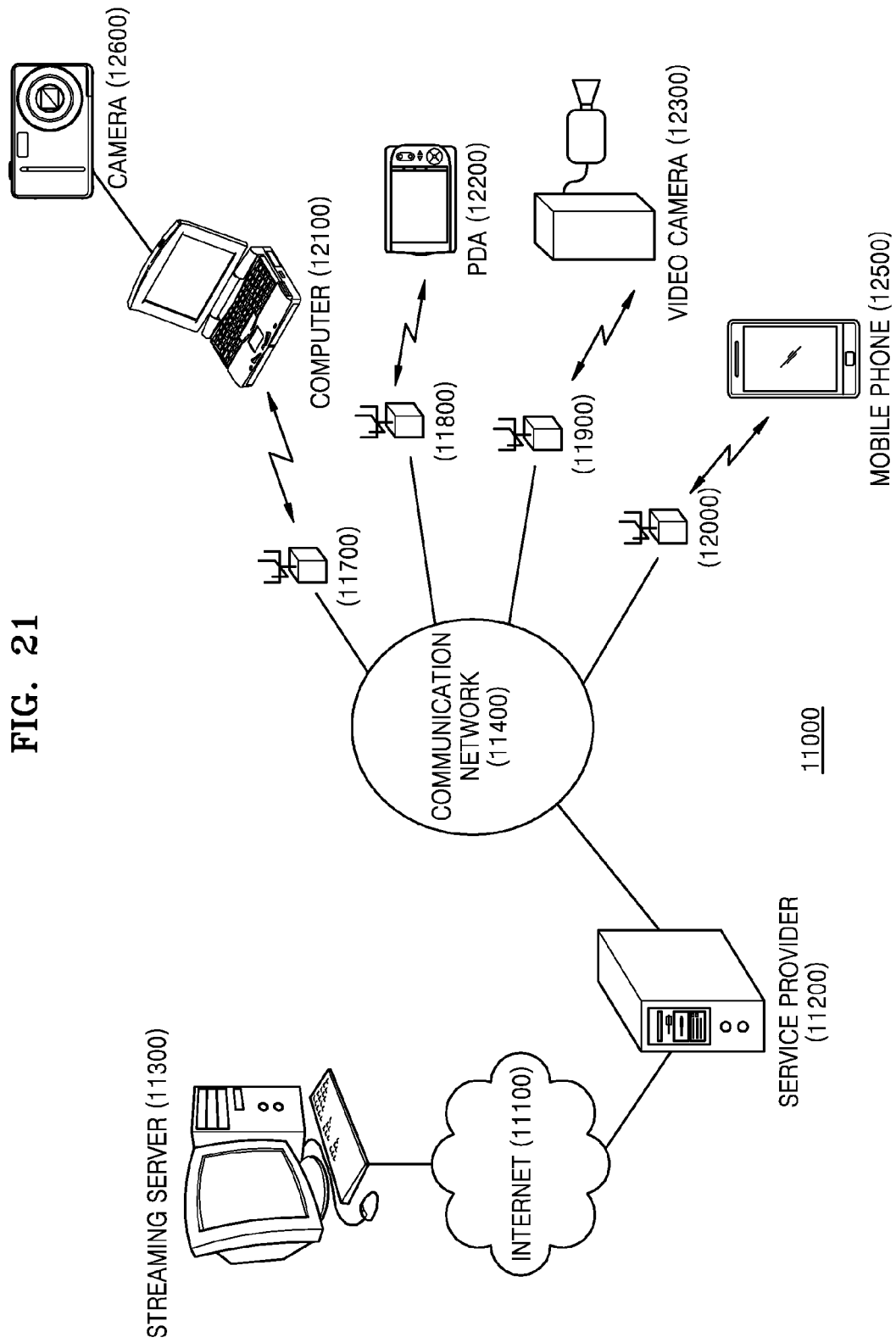
FIG. 21 illustrates an overall structure of a content supply system for providing a content distribution service.

The program that executes at least one of the video encoding method and the video decoding method of the present invention may be stored not only in the disc 26000 illustrated in FIGS. 19 and 21 but may also be stored in a memory card, a ROM cassette, or a solid state drive (SSD).

A system to which the video encoding method and the video decoding method according to the embodiments described above are applied will be described below.

FIG. 21 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 21, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessed by the computer 12100.

If video data is captured by a camera built in the mobile phone 12500, the video data may be received from the mobile phone 12500.

The video data may be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and may transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. The content supply system 11000 also allows the clients to receive the encoded content data and decode and reproduce the encoded content data in real time, thereby enabling personal broadcasting.

Encoding and decoding operations of the plurality of independent devices included in the content supply system 11000 may be similar to those of the video encoding apparatus and the video decoding apparatus of the present invention.

Figure 22:
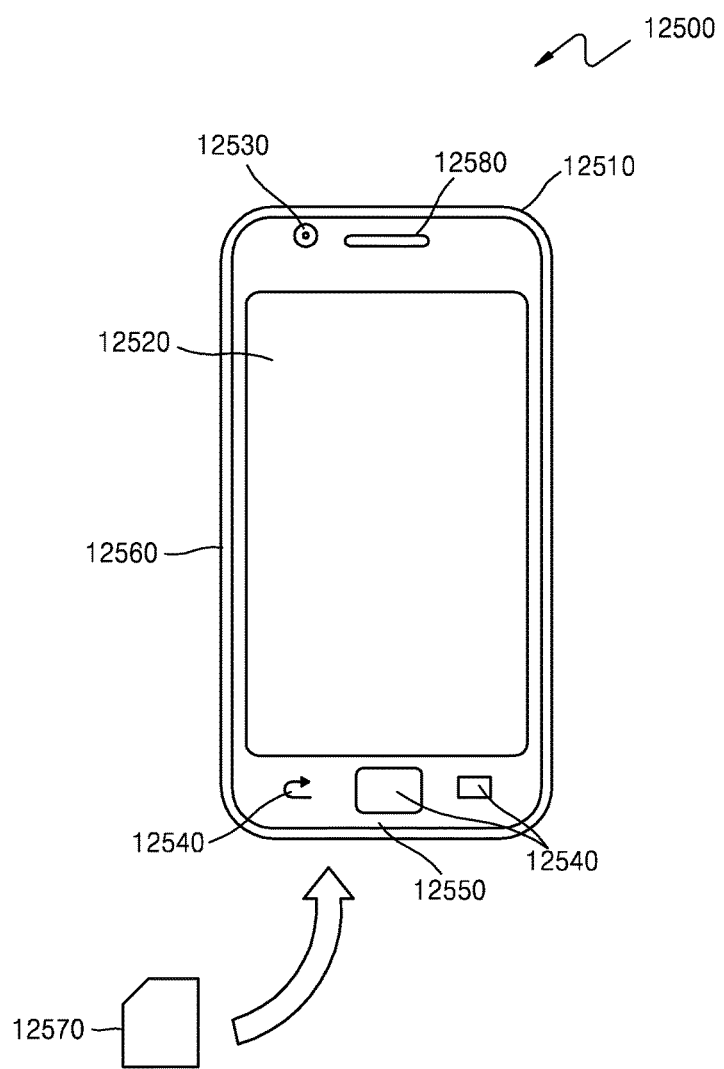
FIGS. 22 and 23 illustrate an external structure and an internal structure of a mobile phone to which a video encoding method and a video decoding method of the present invention are applied, according to an embodiment.
Figure 24:
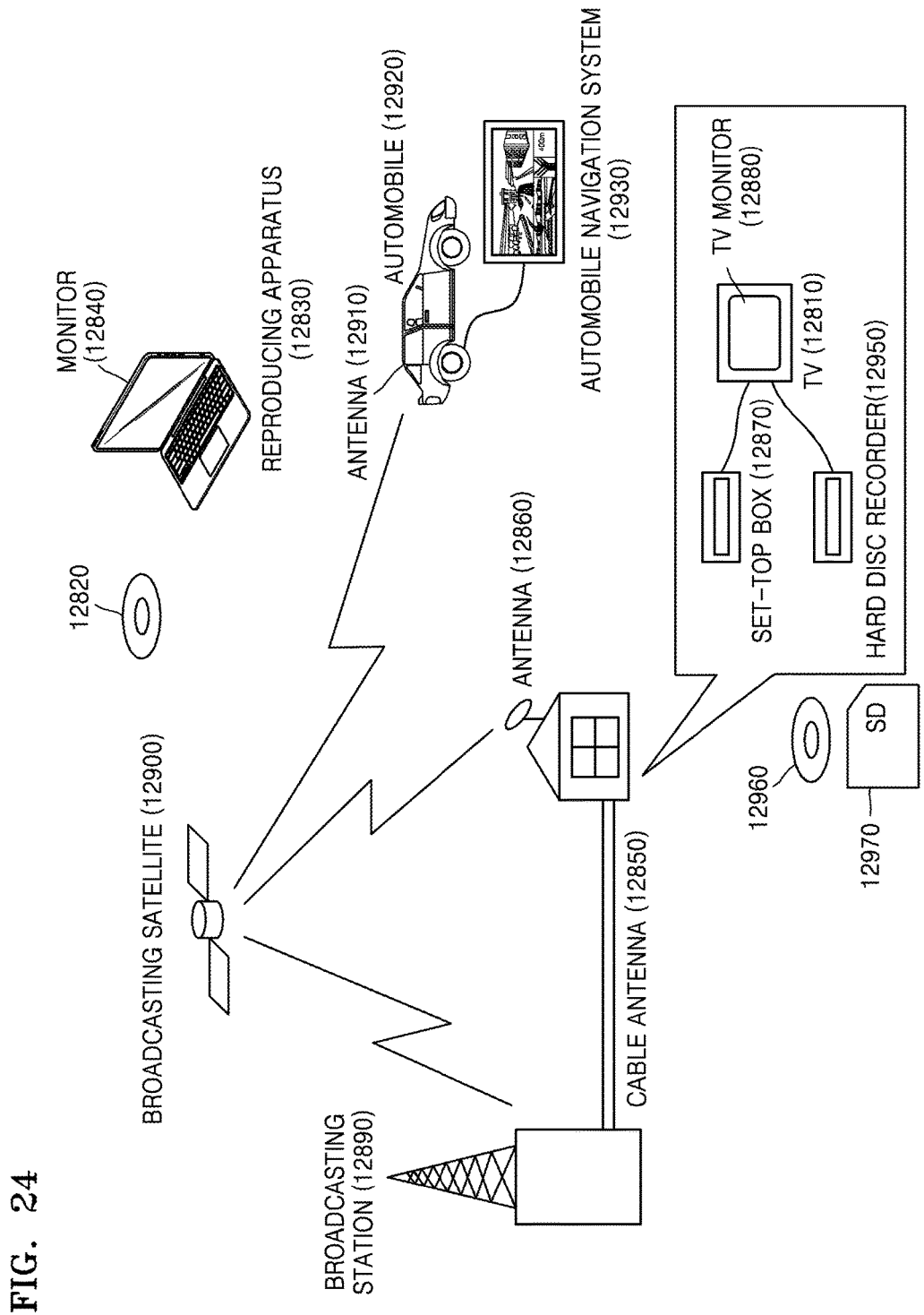
FIG. 24 illustrates a digital broadcasting system employing a communication system, according to an embodiment.

With reference to FIGS. 22 and 24, the mobile phone 12500 included in the content supply system 11000 according to an embodiment will now be described in detail.

FIG. 22 illustrates an external structure of the mobile phone 12500 to which a video encoding method and a video decoding method are applied, according to an embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 23:
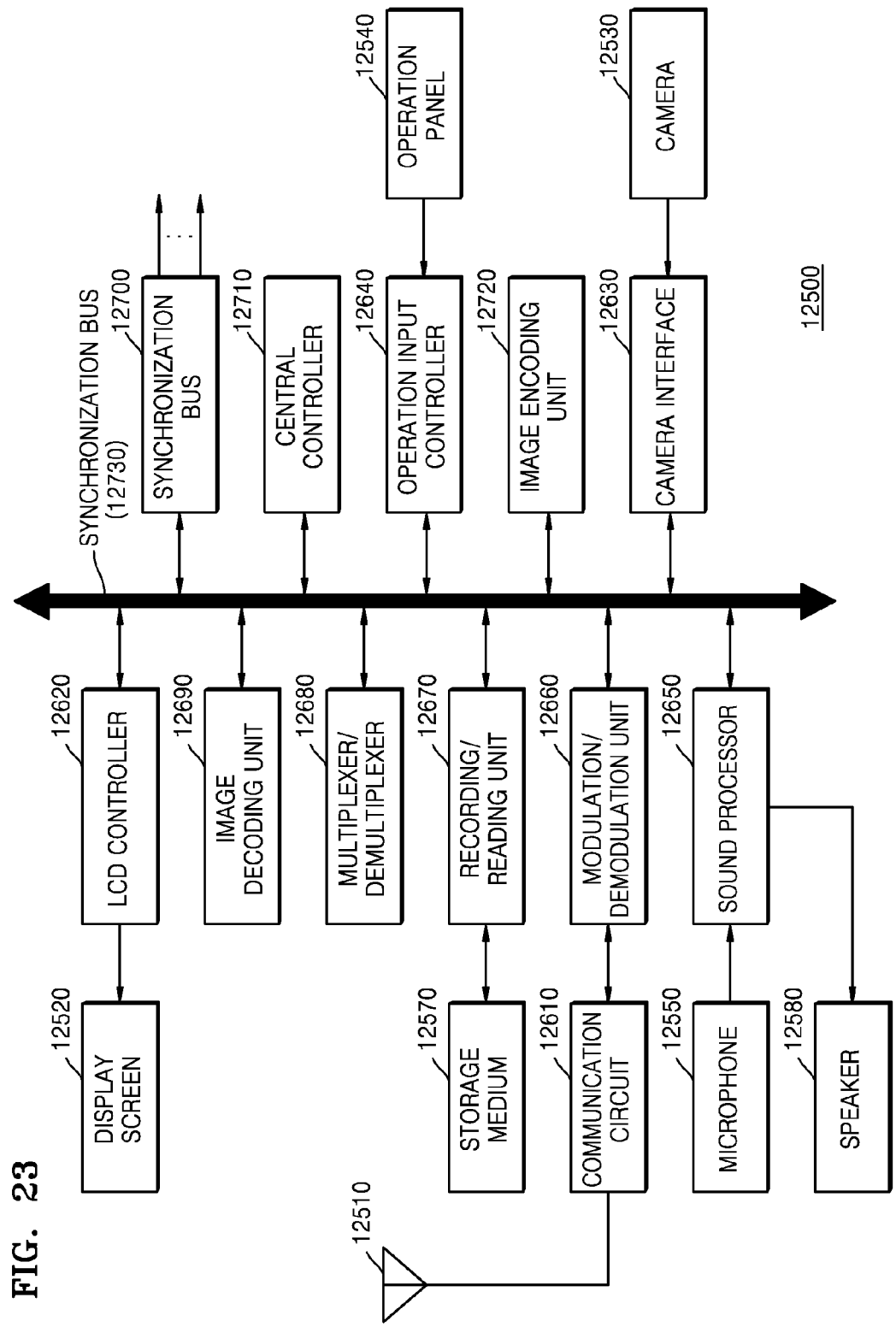

FIG. 23 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a CPU, a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, by control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method of the present invention.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 1150 or another type of communication terminal may be a transceiving terminal including both a video encoding apparatus and a video decoding apparatus according to an exemplary embodiment, may be a transmitting terminal including only the video encoding apparatus, or may be a receiving terminal including only the video decoding apparatus.

A communication system according to an embodiment is not limited to the communication system described above with reference to FIG. 21. For example, FIG. 24 illustrates a digital broadcasting system employing a communication system, according to an embodiment. The digital broadcasting system of FIG. 24 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus of the present invention is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus of the present invention may be installed. Data output from the set-top box 12870 may also be reproduced on a TV monitor 12880.

As another example, the video decoding apparatus of the present invention may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus of the present invention and may then be stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 26. For example, the computer 12100 and the TV receiver 12810 may not include the camera 12530, the camera interface 12630, and the image encoder 12720 of FIG. 23.

Figure 25:
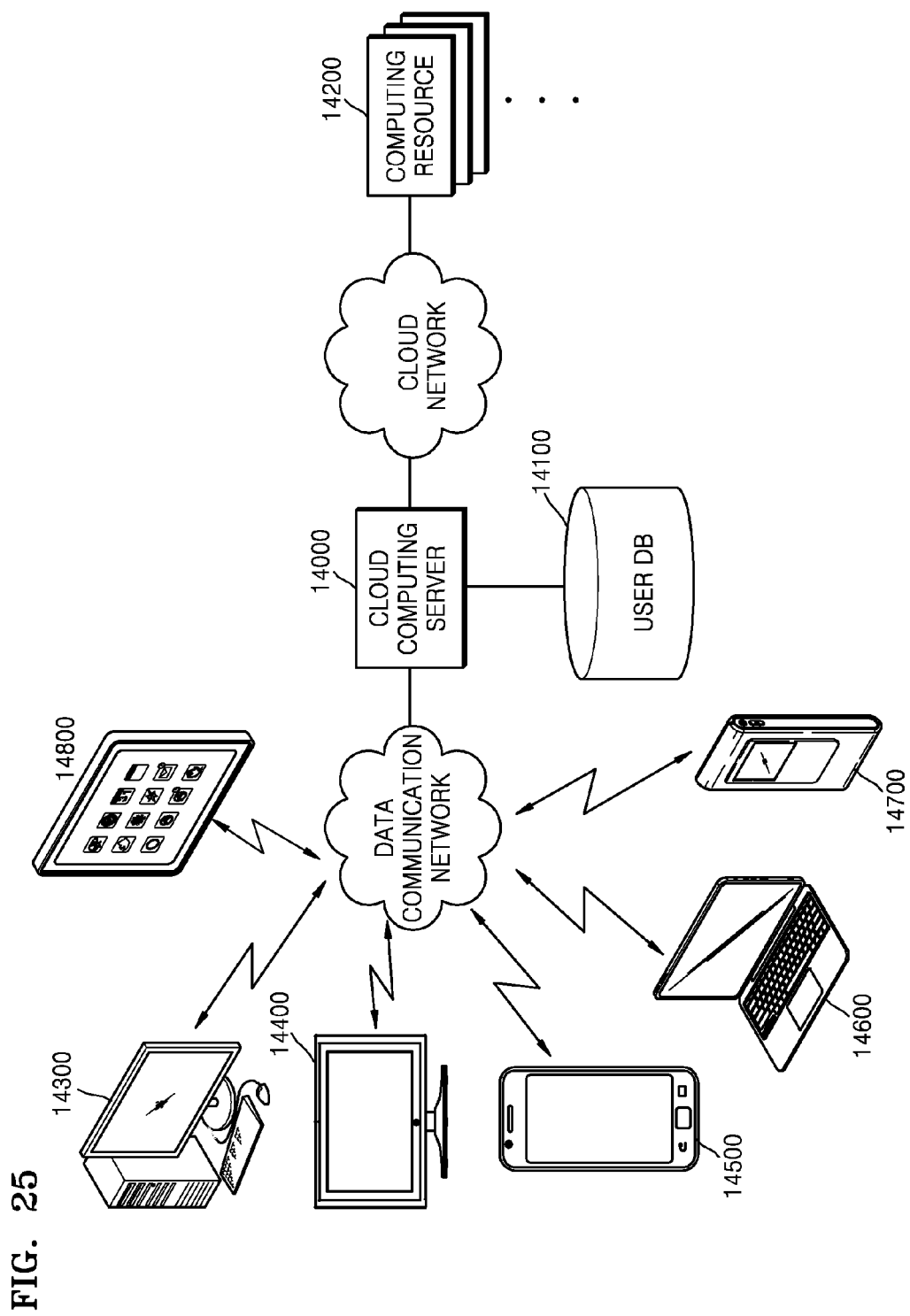
FIG. 25 illustrates a network structure of a cloud computing system using a video encoding apparatus and a video decoding apparatus, according to an embodiment.

FIG. 25 illustrates a network structure of a cloud computing system using a video encoding apparatus and a video decoding apparatus, according to an embodiment.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 23.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. On the other hand, if the user terminal requests to reproduce the video, starting from the pausing point thereof, the cloud computing server 14000 transmits streaming data of the video starting from a frame corresponding to the pausing point, to the user terminal.

In this regard, the user terminal may include the video decoding apparatus as described above with reference to FIGS. 1A through 18. As another example, the user terminal may include the video encoding apparatus as described above with reference to FIGS. 1A through 18. Alternatively, the user terminal may include both the video encoding apparatus and the video decoding apparatus as described above with reference to FIGS. 1A through 18.

Various applications of the video encoding method, the video decoding method, the video encoding apparatus, and the video decoding apparatus described above are described above with reference to FIGS. 1A through 18. However, embodiments of methods of storing the video encoding method and the video decoding method in a storage medium or embodiments of methods of implementing the video encoding apparatus and the video decoding apparatus in a device described above with reference to FIGS. 1A through 18 are not limited to the embodiments of FIGS. 19 through 25.

While the present invention has been particularly shown and described with reference to specific embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

The invention claimed is:

1. An inter-view video decoding method performed by a processor comprising:
    determining, by the processor, a reference value that is a reference for splitting a current block of a depth image corresponding to a texture image, from an average value of reference samples located at apexes of a reference block included in the texture image;
    determining, by the processor, a binary map of the current block by comparing the reference value and reference samples of the current block;
    splitting by the processor, the current block into a first partition that includes a sample located at a top left end of the current block and a second partition that does not include the sample at the top left end of the current block based on the binary map;
    determining, by the processor, a horizontal edge flag by comparing a sample located at a top left end of the binary map and a sample located at a top right end of the binary map;
    determining, by the processor, a vertical edge flag by comparing the sample located at the top left end of the binary map and a sample located at a bottom left end of the binary map; and
    determining, by the processor, a prediction value of the first partition and a prediction value of the second partition based on the horizontal edge flag, the vertical edge flag and adjacent samples of the current block.

2. The inter-view video decoding method of claim 1, wherein samples of the binary map are determined as 0 or 1, and
    wherein the determining of the binary map comprises:
        determining, by the processor, samples of the binary map corresponding to the reference samples according to whether the reference samples are greater than the reference value.

3. The inter-view video decoding method of claim 1, further comprising: determining, by the processor, a prediction value of the current block based on the prediction values and offset information of the current block.

4. An inter-view video decoding apparatus comprising:
a memory storing instructions; and
one or more processors configured to execute the stored instructions to:
- determine a reference value that is a reference for splitting a current block of a depth image corresponding to a texture image, from an average value of reference samples located at apexes of a reference block included in the texture image,
- determine a binary map of the current block by comparing the reference value and reference samples of the current block,
- split the current block into a plurality of partitions based on the binary map,
- determine a horizontal edge flag by comparing a sample located at a top left end of the binary map and a sample located at a top right end of the binary map,
- determine a vertical edge flag by comparing the sample located at the top left end of the binary map and a sample located at a bottom left end of the binary map, and
- determine a prediction value of the first partition and a prediction value of the second partition based on the horizontal edge flag, the vertical edge flag and adjacent samples of the current block.

5. A non-transitory computer-readable recording medium having recorded thereon a computer program for executing the inter-view video decoding method of claim 1.

\* \* \* \* \*